United States Patent [19]
Ohta et al.

[11] Patent Number: 5,278,276
[45] Date of Patent: * Jan. 11, 1994

[54] POLYIMIDE AND HIGH-TEMPERATURE ADHESIVE OF POLYIMIDE

[75] Inventors: Masahiro Ohta, Yokohama; Saburo Kawashima, Yokosuka; Yoshiho Sonobe, Yokohama; Shoji Tamai, Yokohama; Hideaki Oikawa, Yokohama; Kouji Ohkoshi, Kanagawa; Akihiro Yamaguchi, Kamakura, all of Japan

[73] Assignee: Mitsui Toatsu Chemicals, Incorporated, Tokyo, Japan

[*] Notice: The portion of the term of this patent subsequent to Jul. 11, 2006 has been disclaimed.

[21] Appl. No.: 9,091

[22] Filed: Jan. 26, 1993

Related U.S. Application Data

[60] Division of Ser. No. 724,548, Jun. 17, 1991, Pat. No. 5,205,894, which is a division of Ser. No. 611,471, Nov. 9, 1990, Pat. No. 5,087,689, which is a continuation of Ser. No. 334,372, Apr. 6, 1989, abandoned, which is a division of Ser. No. 44,028, Jun. 3, 1987, Pat. No. 4,847,349.

[30] Foreign Application Priority Data

Aug. 27, 1985 [JP] Japan .................. 60-186610
Sep. 19, 1985 [JP] Japan .................. 60-205283
Oct. 11, 1985 [JP] Japan .................. 60-224812
Mar. 5, 1986 [JP] Japan .................. 61-046369

[51] Int. Cl.$^5$ ................................ C08G 73/10
[52] U.S. Cl. .................... 528/125; 528/172; 528/185
[58] Field of Search ................ 528/125, 172, 185

[56] References Cited

U.S. PATENT DOCUMENTS

| | | | |
|---|---|---|---|
| 3,716,549 | 2/1973 | Darsow et al. | 260/297 |
| 4,065,345 | 12/1977 | Progar et al. | 156/309 |
| 4,111,906 | 9/1978 | Jones et al. | 528/229 |
| 4,196,144 | 4/1980 | Darms | 260/571 |
| 4,203,922 | 5/1980 | Jones et al. | 260/570 |
| 4,477,648 | 10/1984 | Jones et al. | 528/185 |
| 4,535,101 | 8/1985 | Lee et al. | 521/189 |
| 4,696,994 | 9/1987 | Nakajima et al. | 528/176 |
| 4,795,798 | 1/1989 | Tamai et al. | 528/185 |
| 4,847,349 | 7/1989 | Ohta et al. | 528/125 |
| 4,883,718 | 11/1989 | Ohta et al. | 428/458 |

FOREIGN PATENT DOCUMENTS

| | | |
|---|---|---|
| 52-35281 | 3/1977 | Japan . |
| 58-155790 | 9/1983 | Japan . |
| 58-157190 | 9/1983 | Japan . |
| 58-190092 | 11/1983 | Japan . |
| 59-76451 | 5/1984 | Japan . |
| 59-168030 | 9/1984 | Japan . |
| 59-170122 | 9/1984 | Japan . |
| 60-243120 | 12/1985 | Japan . |
| 60-258228 | 12/1985 | Japan . |
| 61-143478 | 7/1986 | Japan . |

OTHER PUBLICATIONS

Bell, Journal of Polymer Science: Poly. Chem. Ed., 14, 2275-2292 (1976).
Bell, ibid., 14, 225-235 (1976).
Chemical Abstracts: 100:193178(d) (1984).

*Primary Examiner*—Frederick Krass
*Attorney, Agent, or Firm*—Fisher, Christen & Sabol

[57] ABSTRACT

Polyimide having repeating units of the following formula (I) and its polyamic acid precursor having repeating units of the following formula (II) are disclosed;

(Abstract continued on next page.)

ABSTRACT
continued

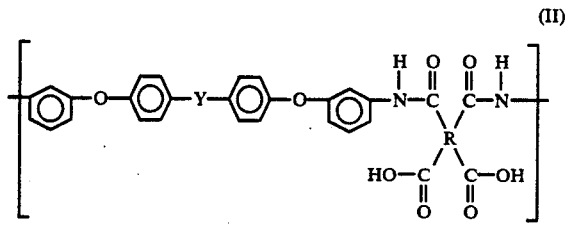
(II)

(where Y is a radical selected from the group consisting of a bond, divalent hydrocarbon having 1 to 10 carbons, hexafluorinated isopropylidene, carbonyl, thio, sulfinyl, sulfonyl and oxide, and R is a tetra-valent radical selected from the group consisting of aliphatic radical having 2 and more carbons, cyclo-aliphatic radical, monoaromatic radical, condensed polyaromatic radical, and non-condensed polyaromatic radical wherein aromatic radicals are mutually connected with a bond or a crosslinking function).

Typical examples of polyimide and polyamic acid include where Y is thio radical and R is

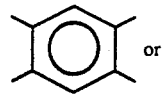 or (III)

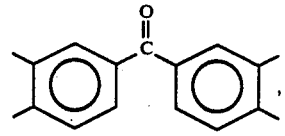 (IV)

Y is a bond and R is III or IV, and Y is isopropylidene radical and R is IV.

The polymers can be prepared from corresponding diamine and tetracarboxylic acid dianhydride.

Polyimide or polyamic acid of this invention is excellent for high-temperature adhesive.

9 Claims, 5 Drawing Sheets

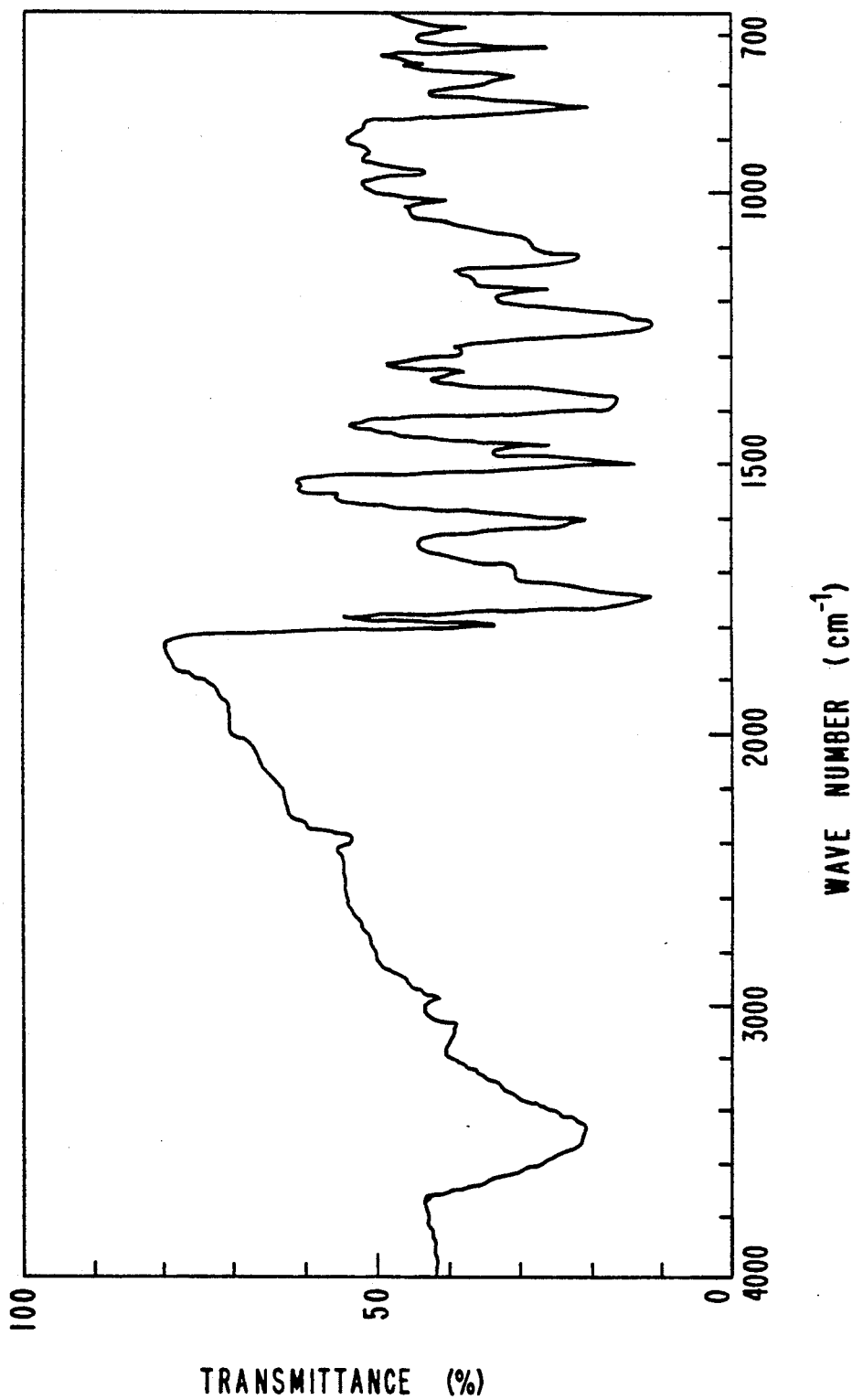

POLYIMIDE AND HIGH-TEMPERATURE ADHESIVE OF POLYIMIDE

This is a divisional of pending prior application Ser. No. 724,548, filed on Jun. 17, 1991 and now U.S. Pat. No. 5,205,894, of Masahiro OHTA et al., for POLYIMIDE AND HIGH-TEMPERATURE ADHESIVE OF POLYIMIDE, which is a divisional of prior application Ser. No. 611,471, filed on Nov. 9, 1990, now U.S. Pat. No. 5,087,689 issued on Feb. 11, 1992, which is a continuation of prior application Ser. No. 334,372, filed on Apr. 6, 1989, now abandoned, which is a divisional of prior application Ser. No. 044,028, filed on Jun. 3, 1987, now U.S. Pat. No. 4,847,349, issued on Jul. 11, 1989.

FIELD OF THE INVENTION

The present invention relates to a novel polyimide and also to a high-temperature adhesive of polyimide. More particularly, this invention relates to a polyimide adhesive which is excellent in high-temperature stability and bonding strength and capable of being applied with a good processability.

BACKGROUND OF THE INVENTION

Polyimide obtained by reacting tetracarboxylic acid dianhydride with diamine is hereafter expected for a wide use in areas where high-temperature stability is required, because of its various excellent properties and good thermal stability.

In addition to the excellent high-temperature stability, polyimide has also good mechanical strength, dimensional stability, flame retardance and electrical insulation and is broadly applied for the materials of electric and electronic appliances, aeronautics and space instruments and transport machinery; and also used for the high-temperature adhesive of various high performance materials in these fields.

Conventional polyimide, however, normally has an excellent thermal stability with a poor processability due to its high softening point. On the other hand, the resin developed for improving the processability is inferior in high-temperature stability and solvent resistance. Thus the performance of polyimide has both merits and drawbacks.

Generally on the use of conventional polyimide, for example, in film manufacture, wire coating, cover seat or adhesive, solvent removal and imidizing are performed by previously dissolving the polyamic acid precursor into organic solvents and applying on adherends, followed by treating at high temperatures. Insufficient thermal treatment, however, causes property reduction through the residual polyamic acid in the film. Thus the above stated heating period necessarily becomes longer and polyimide forming process becomes very difficult, because slow rise of temperature by step-wise heating and reduction of film thickness are required for avoiding the generation of pinholes in the film. Besides cyclizing reaction by dehydration accompanied with heating has problems, for example, of causing uneven thickness or voids in the film or coated layer. Furthermore, polyamic acid requires cold-storage because it is unstable and its solution results in a gradual gelation or hydrolysis even at the room temperature.

The polyimide adhesive developed by D. J. Progar et al. for high-temperature bonding (U.S. Pat. No. 4,065,345) is known to be excellent in both high-temperature stability and adhesive strength. Processing steps, however, are necessary on its use, where the polyamic acid solution in bis(2-methoxyethyl) ether is applied on the substrate surface and heated to cause solvent removal and cyclizing by dehydration. In addition, high-boiling solvents require selection of processing conditions on the rate and pattern of temperature rise up in order to avoid generation of the pinholes and voids.

Polyimide is required for eliminating problems resulted from the processing method which applies said organicsolvent solution of polyamic acid and heats the coated substrates to cause solvent removal and dehydrating imidization. Moreover, thermoplastic polyimide which can be used for adhesive is desired as it is.

DISCLOSURE OF THE INVENTION

The object of this invention is to provide polyimide and its polyamic acid precursor which are thermoplastic and excellent in processability in addition to the essentially superior high-temperature stability inherent to polyimide, and have outstanding high-temperature adhesion being capable of use in multipurpose application.

The inventors of this invention studied hard to accomplish the above object and succeeded in completing the present invention.

One of the present invention is a polymer having repeating units of the formula (I):

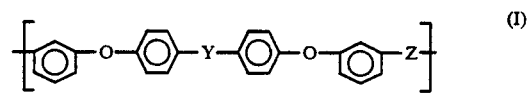

(where
Y is a radical selected from the group consisting of a bond, divalent hydrocarbon having 1 to 10 carbons, hexafluorinated isopropylidene, carbonyl, thio, sulfinyl, sulfonyl and oxide;
Z is

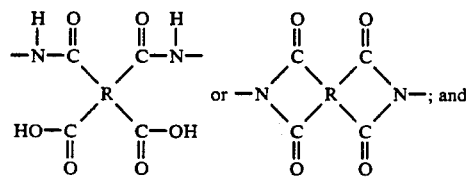

R is a tetra-valent radical selected from the group consisting of aliphatic radical having 2 and more carbons, cyclo-aliphatic radical, monoaromatic radical, condensed polyaromatic radical, and non condensed polyaromatic radical wherein aromatic radicals are mutually connected with a bond or a crosslinking function).

The other of the present invention is a high-temperature stable adhesive comprising a polymer having repeating units of the formula (I):

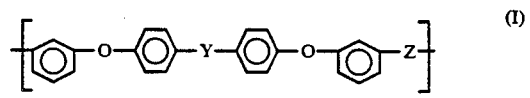

(where
Y is a radical selected from the group consisting of a bond, divalent hydrocarbon having 1 to 10 carbons, hexafluorinated isopropylidene, carbonyl, thio, sulfinyl, sulfonyl and oxide;

Z is

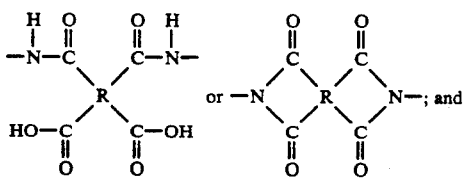

R is a tetra-valent radical selected from the group consisting of aliphatic radical having 2 and more carbons, cyclo-aliphatic radical, monoaromatic radical, condensed polyaromatic radical, and non condensed polyaromatic radical wherein aromatic radicals are mutually connected with a bond or a crosslinking function).

The present invention is a polymer having the repeating units of the formula(I), that is, polyamic acid and/or polyimide having the repeating units of the formula (I) as well as a high-temperature stable adhesive comprising said polyamic acid and/or polyimide.

The polymer of this invention is polyamic acid which is obtained by reacting diamine having the formula (II):

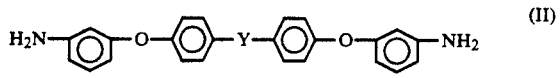

(where Y is a radical selected from the group consisting of a bond, divalent hydrocarbon having 1 to 10 carbons, hexafluorinated isopropylidene, carbonyl, thio, sulfinyl, sulfonyl and oxide), with tetracarboxylic acid dianhydride having the formula (III):

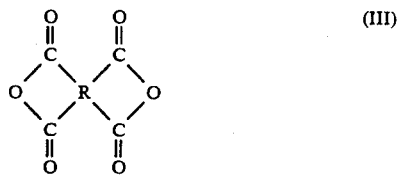

(where R is a tetra-valent radical selected from the group consisting of aliphatic radical having 2 and more carbons, cycloaliphatic radical, monoaromatic radical, condensed polyaromatic radical, and non condensed polyaromatic radical wherein aromatic radicals are mutually connected with a bond or a crosslinking function) and polyimide which is obtained by further cyclized said polyamic acid by dehydration.

Diamine in use for the method includes, for example, bis[4-(3-aminophenoxy)phenyl]methane, 1,1-bis[4-(3-aminophenoxy)phenyl]ethane, 1,2-bis[4-(3-aminophenoxy)phenyl]ethane, 2,2-bis[4-(3-aminophenoxy)phenyl]propane, 2,2-bis[4-(3-aminophenoxy)phenyl]butane, 2,2-bis[4-(3-aminophenoxy)phenyl]-1,1,1,3,3,3-hexafluoropropane, 4,4'-bis(3-aminophenoxy)biphenyl, bis[4-(3-aminophenoxy)phenyl] ketone, bis[4-(3-aminophenoxy)phenyl] sulfide, bis[4-(3-aminophenoxy)phenyl]sulfoxide, bis[4-(3-aminophenoxy)phenyl] sulfone and bis[4-(3-aminophenoxy)phenyl] ether. These diamine can be used alone or in mixtures of two or more.

Polyimide is unknown which derived from ether-diamines having ether linkage and aromatic amino group in the same molecule represented by the formula (II). It is also quite unknown on the adhesive application of said polyimide and its polyamic acid precursor.

Tetracarboxylic acid dianhydride used in the method includes, for example, ethylene tetracarboxylic dianhydride, cyclopentane carboxylic dianhydride, pyromellitic dianhydride, 3,3',4,4'-benzophenone tetracarboxylic dianhydride, 2,2',3,3'-benzophenone tetracarboxylic dianhydride, 3,3',4,4'-biphenyl tetracarboxylic dianhydride, 2,2',3,3'-biphenyl tetracarboxylic dianhydride, 2,2-bis(3,4-dicarboxyphenyl)propane dianhydride, 2,2-bis(2,3-dicarboxyphenyl)propane dianhydride, bis(3,4-dicarboxyphenyl) ether dianhydride, bis(3,4-dicarboxyphenyl) sulfone dianhydride, 1,1-bis-(2,3-dicarboxyphenyl)ethane dianhydride, bis(2,3-dicarboxyphenyl)methane dianhydride, bis(3,4-dicarboxyphenyl)methane dianhydride, 2,3,6,7-naphthalene tetracarboxylic dianhydride, 1,4,5,8-naphthalene tetracarboxylic dianhydride, 1,2,5,6-naphthalene tetracarboxylic dianhydride, 1,2,3,4-benzene tetracarboxylic dianhydride, 3,4,9,10-perylene tetracarboxylic dianhydride, 2,3,6,7-anthracene tetracarboxylic dianhydride and 1,2,7,8-phenanthrene tetracarboxylic dianhydride. Tetracarboxylic acid dianhydride can be used alone or in mixtures of two or more.

The polymer can be normally prepared by reacting etherdiamine with tetracarboxylic acid dianhydride in the organic solvents. The organic solvents used in the reaction include, for example, N,N-dimethylformamide, N,N-dimethylacetamide, N,N-diethylacetamide, N,N-dimethyl-methoxyacetamide, N-methyl-2-pyrrolidone, 1,3-dimethyl-2-imidazolidinone, N-methyl caprolactam, 1,2-dimethoxyethane, bis(2-methoxyethyl) ether, 1,2-bis(2-methoxyethoxy)ethane, bis[2-(2-methoxyethoxy)ethyl] ether, tetrahydrofuran, 1,3-dioxane, 1,4-dioxane, pyridine, picoline, dimethyl sulfoxide, dimethyl sulfone, tetramethylurea, hexamethylphosphoramide, m-cresol, p-chlorophenol and anisole. These solvents can be used alone or in mixtures of two or more.

The reaction temperature is normally 60° C. or less, preferably 50° C. or less. The reaction pressure is not restricted in particular and atmospheric pressure is sufficient for carrying out the reaction. The reaction time depends upon the type of solvents and reaction temperature, and is normally enough to complete the formation of polyamic acid represented by the formula (I). Reaction for 4 to 24 hours is normally sufficient.

Such reaction affords polyamic acid having repeating units of the formula (I):

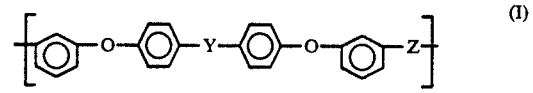

(where

Y is a radical selected from the group consisting of a bond, divalent hydrocarbon having 1 to 10 carbons, hexafluorinated isopropylidene, carbonyl, thio, sulfinyl, sulfonyl and oxide;

Z is

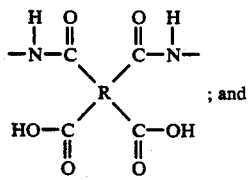

; and

R is a tetra-valent radical selected from the group consisting of aliphatic radical having 2 and more carbons, cyclo-aliphatic radical, monoaromatic radical, condensed polyaromatic radical, and non condensed polyaromatic radical wherein aromatic radicals are mutually connected with a bond or a crosslinking function).

In the next step, thermal dehydration of the polyamic acid solution at 100° to 400° C., preferably at 100° to 300° C. or chemical dehydration by treating with imidizing agent such as acetic anhydride afford the corresponding polyimide having the repeating units of the formula (I):

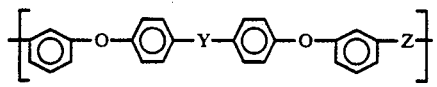 (I)

(where
Y is the same as above;
Z is

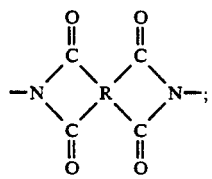

and R is the same as above).

When polyimide thus obtained is separated from the solution, it is filtered, washed and dried.

When polyimide is partially separated or completely dissolved, the solution is poured into a poor solvent of polyimide such as water or methanol as it is. The separated product is, when needed, washed, purified and dried to give polyimide powder, When the resultant polyimide is dissolved into the polymerization solvent, the polyimide solution can also be used as it is.

The method of applying the polymer thus obtained for adhesive is roughly divided into two procedures.
(1) The polymer is used as an adhesive solution containing said polyamic acid as a main component.
(2) The polymer is mainly used in the form of said polyimide.

In the procedure (1), the adhesive solution is an organic polar solvent solution of polyamic acid. It may be the resultant reaction mixture of polyamic acid obtained by reacting ether diamine with tetracarboxylic acid dianhydride in the organic polar solvents. It also may be the solution containing polyamic acid as the main component and polyimide which is a cyclized product of polyamic acid. Thus the adhesive solution containing polyamic acid may be the solution or suspension containing polyimide as an auxiliary ingredient.

When applying the adhesive containing such polyamic acid, a thin layer of polyamic acid adhesive is formed on the adherends to be bonded, followed by preheating the coated adherends in air for a desired period at about 220° C. Excess solvents are removed and the polyamic acid adhesive is converted to a more stable polyimide. The adherends are then strongly bonded by pressing under pressure of 1–1,000 kg/cm² at temperature of 50°–400° C., followed by curing at temperature of 100°–400° C.

In the procedure (2) wherein said polyimide is used for the adhesive, it is roughly divided into three cases.
(a) Said polyimide is used as powder as it is.
(b) Said polyimide is dissolved into the solvents or used in the form of resultant solution at the end of imidization.
(c) Said polyimide is previously formed to films before use.

In these cases, some of said polyamic acid may be contained in said polyimide.

In the case (a), the adherends can be strongly bonded by inserting the powder between the adherends, pressing under pressure of 1–1,000 kg/cm² at temperature of 50°–400° C. and curing at temperature of 100°–400° C.

In the case (b), the thin layer of polyimide containing solution adhesive is formed on the adherends to be bonded, followed by preheating the adherends in air for the desired period at about 30°–200° C. to remove the solvents. The coated adherends are assembled with other adherends, pressed under pressure of 1–1,000 kg/cm² at temperature of 50°–400° C. and cured at temperature of 100°–400° C. to give strongly bonded adherends.

In this procedure, a desired quantity of said polyimide containing solution is coated and heated at 30°–200° C. to remove the solvents. The coating can be made insoluble in the organic solvents by further heating above 250° C. Such organic solvents include halogenated aliphatic hydrocarbon, phenol, cresol, halophenols, N,N-dimethylacetamide, N-methyl-2-pyrrolidone, sulfolane and N,N-dimethylformamide.

In the case (c), polyimide films are obtained by casting the polyimide containing solution and heating at 20°–200° C. Homogenous polyimide films without voids and pinholes can be obtained by using halogenated aliphatic hydrocarbon as solvents in particular.

To apply the polyimide films for adhesion, the films are inserted between the adherends and pressed under pressure of 1–1,000 kg/cm² at temperature of 50°–400° C. The adherends can be strongly bonded by curing at temperature of 100°–400° C.

Any polyimide in this invention is thermoplastic and has excellent properties as high-temperature adhesive. Particularly preferred polyimides are as follows.

The first polyimide has repeating units represented by the formula (IV):

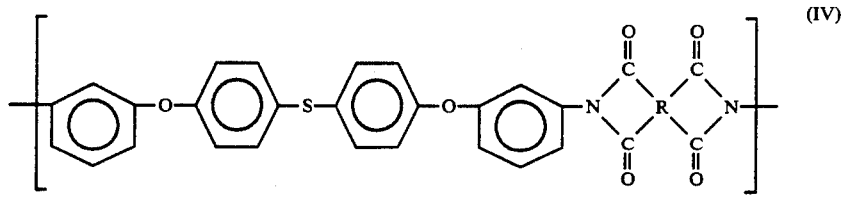

(where R is a tetra-valent radical selected from the group consisting of aliphatic radical having 2 and more carbons, cycloaliphatic radical, monoaromatic radical, condensed polyaromatic radical, and non condensed polyaromatic radical wherein aromatic radicals are mutually connected with a bond or a crosslinking function).

This polyimide is a novel polyimide and obtained by polymerizing bis[4-(3-aminophenoxy)phenyl] sulfide as diamine component with one or more tetracarboxylic acid dianhydride to give polyamic acid which is further cyclized by dehydration.

This polyimide is characterized in that bis[4-(3-aminophenoxy)phenyl] sulfide is used as diamine component, and particularly excellent in processability and high-temperature adhesion. By the way, bis[4-(4-aminophenoxy)phenyl] sulfide isomer having amino groups at different positions is used in place of bis[4-(3-aminophenoxy)phenyl] sulfide. The polyimide obtained by reacting with tetracarboxylic acid dianhydride, for example, pyromellitic dianhydride or 3,3',4,4'-benzophenone tetracarboxylic dianhydride, has no distinct glass transition temperature, almost no or very little bonding strength and poor processability.

Polyimide of this invention is thermoplastic while maintaining the same level of high-temperature stability as conventional polyimide, and thus excellent in processability and high-temperature adhesion. Some of polyimide in this invention are very stable at high temperature and can be molded by fusion. Besides polyimide films derived from some kind of tetracarboxylic acid dianhydride are colorless, which is an excellent characteristic.

Therefore polyimide of this invention is very valuable as the raw materials for aeronautics and space instruments, electric and electronic appliances, and further as the high-temperature adhesive.

This polyimide can be prepared by the following method.

Polyamic acid is obtained by polymerizing bis[4-(3-aminophenoxy)phenyl] sulfide with tetracarboxylic acid dianhydride in the organic solvents.

In the present invention, the inherent viscosity of polyamic acid precursor of polyimide is required to be in the range of 0.1 to 3.0 dl/g, preferably 0.3 to 2.5 dl/g. is measured at 35° C. with a solution containing 0.5 gram of polyamic acid in 100 ml of N,N-dimethylacetamide solvent.

The corresponding polyimide can be obtained from resultant polyamic acid by thermal dehydration at 100°–400° C. or by chemical dehydration with conventional imidizing agents.

The second polyimide has repeating units represented by the formula (V):

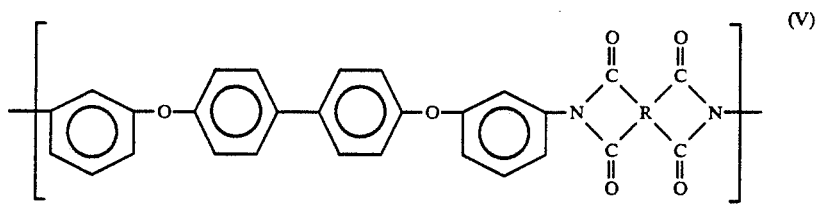

(where R is a tetra-valent radical selected from the group consisting of aliphatic radical having 2 and more carbons, cycloaliphatic radical, monoaromatic radical, condensed polyaromatic radical, and non condensed polyaromatic radical wherein aromatic radicals are mutually connected with a bond or a crosslinking function).

This polyimide is a novel polyimide and obtained by polymerizing 4,4'-bis(3-aminophenoxy)biphenyl as diamine component with one or more tetracarboxylic acid dianhydride to give polyamic acid which is further cyclized by dehydration.

This polyimide is characterized in that 4,4'-is(3-aminophenoxy)biphenyl is used as diamine component, particularly excellent in processability and high-temperature adhesion. By the way, 4,4'-bis(4-aminophenoxy)biphenyl isomer having amino groups at different positions is used in place of 4,4'-bis(3-aminophenoxy)biphenyl. The polyimide obtained by reacting with tetracarboxylic acid dianhydride, for example, pyromellitic dianhydride or 3,3',4,4'-benzophenone tetracarboxylic dianhydride, has no distinct glass transition temperature, almost no or very little bonding strength and poor processability.

Polyimide of this invention is thermoplastic while maintaining the same level of high-temperature stability as conventional polyimide, and thus excellent in processability and high-temperature adhesion. Some polyimide in this invention are very stable at high temperature and can be molded by fusion.

Besides this polyimide has characteristics of low water absorption and good transparency in addition to the excellent processability.

Therefore polyimide of this invention is very valuable as the raw materials for aeronautics and space instruments, electric and electronic appliances, and further as the high-temperature adhesive.

This polyimide can be prepared by the following method.

Polyamic acid is obtained by polymerizing 4,4'-bis(3-aminophenoxy)biphenyl with tetracarboxylic acid dianhydride in the organic solvents.

In the present invention, the inherent viscosity of polyamic acid precursor of polyimide is required to be in the range of 0.1 to 4.0 dl/g, preferably 0.3 to 2.5 dl/g.

The corresponding polyimide can be obtained from resultant polyamic acid by thermal dehydration at 100°–400° C. or by chemical dehydration with conventional imidizing agents.

The third polyimide is also a preferable one and has repeating units represented by the formula (VI):

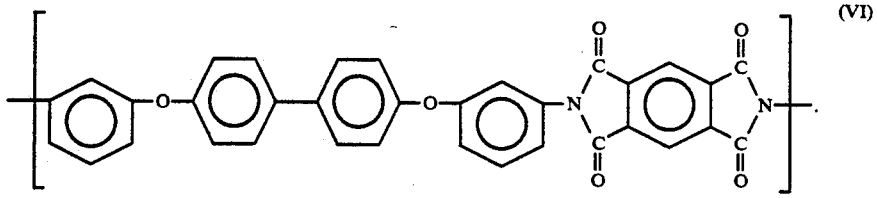

This polyimide is a novel polyimide and obtained by polymerizing 4,4'-bis(3-aminophenoxy)biphenyl as diamine component with pyromellitic dianhydride as tetracarboxylic acid dianhydride component to give polyamic acid which is further cyclized by dehydration.

Besides a feature of this polyimide is thermoplastic while maintaining the same level of high-temperature stability as conventional polyimide. Therefore this polyimide can be molded by fusion and is excellent in processability and high-temperature stability.

In addition, this polyimide has further characteristics of low water absorption, high resistance to solvent and alkali, and excellent flexibility.

Therefore polyimide of this invention is very valuable as the raw materials for aeronautics and space instruments as well as electric and electronic appliances.

This polyimide can be prepared by the following method.

Polyamic acid is obtained by polymerizing 4,4'-bis(3-aminophenoxy)biphenyl with pyromellitic dianhydride in the organic solvents.

In the present invention, the inherent viscosity of polyamic acid precursor of polyimide is required to be in the range of 0.1 to 4.0 dl/g, preferably 0.3 to 2.5 dl/g.

The corresponding polyimide can be obtained from resultant polyamic acid by thermal dehydration at 100°–400° C. or by chemical dehydration with imidizing agents such as acetic anhydride.

Furthermore, polyimide having repeating units of the formula (I) can also be obtained by suspending or dissolving 4,4'-bis(3-aminophenoxy)biphenyl and pyromellitic dianhydride in the organic solvents, and heating to perform simultaneous generation and dehydrating imidization of polyamic acid which is the precursor of polyimide.

The forth polyimide has repeating units represented by the formula(VIII):

2,2-Bis[4-(3-aminophenoxy)phenyl]propane is reacted as diamine component with 3,3',4,4'-benzophenone tetracarboxylic dianhydride to give polyamic acid having the repeating units represented by the formula (I). Polyamic acid is cyclized by dehydration to give polyimide.

A remarkable characteristic of this polyimide is that it is soluble in halogenated aliphatic hydrocarbon.

Regarding 2,2-bis[4-(3-aminophenoxy)phenyl]propane of this invention, it is briefly described in TOKKAISHO 59-170,122 that the compound can be prepared by reducing the dinitro compound obtained by reacting m-chloronitrobenzene with 2,2-bis(4-hydroxyphenyl)propane. No description, however, is found on melting point or other properties indicating the structure of this compound.

On the other hand, organic solvent soluble polyimide which contains 2,2-bis[4-(3-aminophenoxy)phenyl]propane as diamine component and 3,3',4,4'-benzophenone tetracarboxylic dianhydride as tetracarboxylic acid dianhydride component, is reported to be valuable for the adhesive of substrates in use for flexible printed circuits (TOKKAISHO 58-157,190). In this method, however, 2,2-bis[4-(3-aminophenoxy)phenyl]propane is only disclosed as a type of many diamine components. Description on polyamic acid or polyimide derived from this diamine is also not found at all. Besides, in this reference, the resultant polyimide resin is reported to be soluble in the organic solvents. Cited organic solvents include phenol, cresol, halophenols, nitrobenzene, sulfolane, N-methyl-2-pyrrolidone and N,N-dimethylacetamide. These solvents have relatively high boiling points.

Polyimide of this invention having inherent viscosity of 0.05 to 1.5 dl/g which is obtained by reacting 2,2-bis[4-(3-aminophenoxy)phenyl]propane with 3,3',4,4'-benzophenone tetracarboxylic dianhydride to give polyamic acid before cyclizing by dehydration, can be used for adhesive with a good workability, because the polyimide has excellent high-temperature stability and powerful adhesive strength and is soluble in halogenated aliphatic hydrocarbon.

To achieve the excellent adhesion in the method of this invention, inherent viscosity of 0.05 to 1.5 dl/g is required for polyimide. Adhesive strength is poor at 0.05 or less. Preparation becomes difficult and adhesive

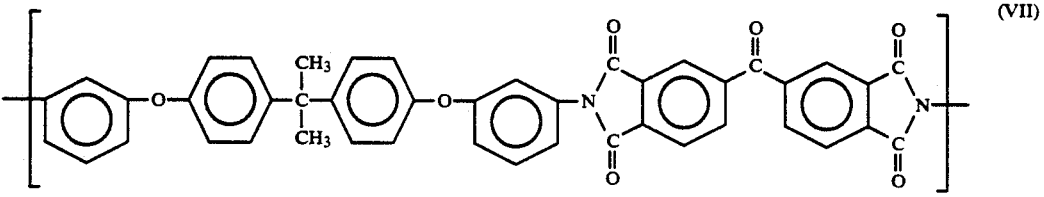

This polyimide can be prepared by the following method.

strength decreases at 1.5 or more.

To apply polyimide of this invention for the adhesive, polyimide power can be used as it is, or the solution in polymerization/imidization solvents also can be used as it is. The solution in halogenated aliphatic hydrocarbon is preferably used in particular.

When providing casted films or preparing coated layers on metal surface and further applying them for bonding, strong adhesion can be obtained by dissolving polyimide of this invention into the halogenated aliphatic hydrocarbon and other organic solvents. Because the cyclizing step by dehydration is not included as in the case of applying organic solvent solution of polyamic acid, and thus void generation by foaming or ununiformity of films does not ocurr.

The halogenated aliphatic hydrocarbon solvents in this invention have relatively low boiling point, evaporate at lower temperatures, and are easy to process without complicated steps for temperature rise. Besides these solvents have low toxicity as compared with cresol and halophenols which are generally used for the solvents of wire varnishes and metal coatings. Therefore this invention is advantageous in varnish industry from environmental viewpoint.

The polyimide films prepared by casting the halogenated aliphatic hydrocarbon solution of polyimide and cured at above 250° C., or prepared by thermally removing the solvents and imidizing the organic solvent solution of the polyamic acid precursor of polyimide and cured, have the characteristic of very high chemical resistance, because the films are insoluble in the organic solvents including halogenated aliphatic hydrocarbon, cresol, halophenols, N,N-dimethyl acetamide, N-methyl-2-pyrrolidone, sulfolane, and N,N-dimethyl formamide.

The former in particular which is applied as the solution in halogenated aliphatic hydrocarbon, has a merit that it is easy to handle and after curing it becomes stable and insoluble in organic solvents.

2,2-Bis[4-(3-aminophenoxy)phenyl]propane is used as diamine component in this invention.

While polyimide derived from 2,2-bis[4-(4-aminophenoxy)phenyl]propane isomer having amino groups at different positions and 3,3',4, gives extremely low adhesive strength, polyimide of this invention has excellent halogenated aliphatic hydrocarbon solubility and high-temperature adhesive strength.

THE BEST MODE OF OPERATION OF THE INVENTION

The invention will be illustrated further with respect to the following Examples, Comparative examples and Synthetic examples.

SYNTHETIC EXAMPLE 1

A 3 liter glass reaction vessel was charged with 218 grams (1 mol) of bis[4-hydroxyphenyl] sulfide, 403 grams (2.4 mols) of m-dinitrobenzene, 331 grams (2.4 mols) of potassium carbonate and 2.5 liters of N,N-dimethylformamide, and conducted the reaction for 20 hours at 145°–150° C.

After ending the reaction, the resultant mixture was cooled, filtered and the solvent was vacuum distilled from the filtrate. The residue was cooled to 65° C., added with 800 ml of methanol and stirred for an hour. The separated crystals were filtered, washed with methanol and dried to gave 429 grams (92.3% yield) of bis[4-(3-nitrophenoxy)phenyl] sulfide as crystals. In the next step, 428 grams (0.93 mol) of the crude crystals were charged into a 3 liter glass reaction vessel, and added with 22.6 grams of active carbon, 0.9 gram of ferric chloride hexahydrate and 1.5 liters of ethyleneglycol monomethylether.

The mixture was stirred for 0.5 hour under reflux, followed by dropping 155.2 grams (3.1 mols) of hydrazine hydrate at 110°–115° C. for 2 hours, and stirred for further 3.5 hours under reflux. The resultant reaction mixture was cooled and filtered to remove the catalyst. The filtrate was vacuum concentrated, followed by adding 205 ml of 35% hydrochloric acid, 1,120 ml of water and 480 ml of isopropyl alcohol, and warmed. The resultant solution was charged with 20 grams of active carbon and hot-filtered. The filtrate was added with 112 grams of sodium chloride and cooled. The separated hydrochloride crystals were filtered and the crystals obtained were neutralized with aqueous ammonia by normal procedure to give 265 grams (66% yield) of desired bis[4-3-aminophenoxy)phenyl] sulfide.

Colorless crystals: mp. 112.4°–113.4° C. (corr.)
Purity: 99.9% or more.

| Elementary analysis: $C_{24}H_{20}N_2O_2S$ | | | | |
|---|---|---|---|---|
| | C | H | N | S |
| Calculated (%) | 71.97 | 5.03 | 7.00 | 8.01 |
| Found (%) | 71.90 | 4.54 | 6.92 | 7.72 |

MS (FD): 400 (M+)
IR (KBr.cm$^{-1}$): 3390 and 3300 (amino group), 1220 (ether linkage)

SYNTHETIC EXAMPLE 2

A 3 liter glass reaction vessel was charged with 186 grams (1.0 mol) of 4,4'-dihydroxybiphenyl, 438 grams (2.6 mols) of m-dinitrobenzene, 363 grams of potassium carbonate and 2.0 liters of N,N-dimethylformamide, and conducted the reaction for 16 hours at 145°–150° C.

After ending the reaction, the resultant mixture was cooled, filtered inorganic salt and the solvent was vacuum distilled from the filtrate. The residue was cooled to 65° C., added with 2.0 liters of methanol and stirred for an hour. The separated crystals were filtered, washed with water and methanol successively, and dried to give 426 grams (99.5% yield) of 4,4'-bis(3-nitrophenoxy)biphenyl as brown crystals. In the next step, 100 grams (0.23 mol) of crude 4,4'-bis(3-nitrophenoxy)biphenyl thus obtained were charged into a 1 liter sealed glass reaction vessel with 1 gram of 5% Pd/C (from Japan Engelhardt Co.) and 350 ml of ethyleneglycol monomethylether.

Hydrogen was introduced at 60°–65° C. under vigorous stirring and its absorption was stopped after 8 hours. The resultant mixture was cooled, filtered to remove the catalyst and poured into 500 ml of water. The separated crystals were filtered, and added with 48 grams of 35% hydrochloric acid and 540 ml of 50% isopropyl alcohol, and warmed. The resultant solution was allowed to cool and hydrochloride of 4,4'-bis(3-aminophenoxy)biphenyl was separated. The separated crystals were filtered and dissolved into 540 ml of 50% isopropyl alcohol by warming, added with 5 grams of active carbon and filtered. The filtrate was neutralized with aqueous ammonia. The separated crystals were filtered, washed with water and dried to give 72.0 grams (85% yield) of desired 4,4'-bis(3-aminophenoxy)biphenyl.

Colorless crystals: mp. 144°–146° C.

Purity: 99.6% (based on high-speed liquid chromatography)

| Elementary analysis: $C_{24}H_{20}N_2O_2$ | | | |
|---|---|---|---|
| | C | H | N |
| Calculated (%) | 78.26 | 5.43 | 7.61 |
| Found (%) | 78.56 | 5.21 | 7.66 |

MS: 368 (M+), 340,184
IR (KBr.cm$^{-1}$): 3400 and 3310 (amino group), 1240 (ether linkage)

SYNTHETIC EXAMPLE 3

2,2-Bis[4-(3-aminophenoxy)phenyl]propane was prepared as follows.

A 2 liter glass reaction vessel was charged with 85.6 grams (0.38 mol) of 2,2-bis(4-hydroyphenyl)propane, 151.2 grams (0.9 mol) of m-dinitrobenzene, 124.6 grams of potassium carbonate and 660 ml of N,N-dimethylformamide, and conducted the reaction for 10 hours at 145°-150° C.

After ending the reaction, the resultant mixture was cooled, solid matter was filtered and the solvent was vacuum distilled from the filtrate. The residue was cooled to 65° C., added with 450 ml of methanol and stirred for an hour. The separated crystals were filtered, washed with water and methanol successively, and dried to gave 164.8 grams (93.5% yield) of 2,2-bis[4-(3-nitrophenoxy)phenyl]propane as yellowish brown crystals. Crude crystals were recrystallized from ethyleneglycol monomethylether to give pure product.

Light yellow prisms: mp. 111°-113° C.

| Elementary analysis: $C_{27}H_{22}N_2O_6$ | | | |
|---|---|---|---|
| | C | H | N |
| Calculated (%) | 68.93 | 4.71 | 5.96 |
| Found (%) | 69.05 | 4.65 | 5.94 |

MS: 470 (M+), 455 (M—CH$_3$)+
IR (KBr.cm$^{-1}$): 1520 and 1340 (nitro group), 1240 (ether linkage)

In the next step, 100 grams (0.21 mol) of 2,2-bis[4-(3-nitrophenoxy)phenyl]propane thus obtained were charged into a 1 liter sealed glass reaction vessel with 5.0 grams of 5% Pd/C and 300 ml of ethyleneglycol monomethylether.

Hydrogen was introduced at 60°-65° C. under vigorous stirring and its absorption was stopped after 8 hours. The resultant mixture was cooled, filtered to remove the catalyst, and 150 ml of ethyleneglycol monomethylether was distilled off. The residue was added with 270 grams of 20% hydrochloric acid and further added with 30 grams of sodium chloride and cooled to 20°-25° C. with stirring. The separated crystals were filtered and neutralized with aqueous ammonia in 30% isopropyl alcohol.

The separated crystals were filtered, washed with water, dried and recrystallized from benzene - n-hexane mixture to give 69.2 grams (80% yield) of 2,2-bis[4-(3-aminophenoxy)phenyl]propane.

Colorless crystals: mp. 106°-108° C.
Purity: 99.5% (based on high-speed liquid chromatography)

| Elementary analysis: $C_{27}H_{26}N_2O_6$ | | | |
|---|---|---|---|
| | C | H | N |
| Calculated (%) | 79.02 | 6.34 | 6.83 |
| Found (%) | 79.21 | 6.40 | 6.71 |

MS: 410 (M+), 395 (M—CH$_3$)+
IR (KBr.cm$^{-1}$): 3460 and 3370 (amino group), 1220 (ether linkage)

EXAMPLE 1

A reaction vessel with a stirrer, reflux condenser and nitrogen inlet tube was charged with 40 grams (0.1 mol) of bis[4-(3-aminophenoxy)phenyl] sulfide and 184.5 grams of N,N-dimethylacetamide. Under nitrogen atmosphere and at the room temperature, 21.5 grams (0.0986 mol) of pyromellitic dianhydride were added by portions with care to avoid temperature rise of the solution and stirred for 22 hours at room temperature. The inherent viscosity of polyamic acid thus obtained was 1.4 dl/g.

The polyamic acid solution was applied on a cold rolled steel panel (JIS G3141, SPCC/SD, 25×100×1.6 mm.) which was previously washed with trichloroethylene, and heated for an hour each at 100° C. and 220° C. The treated panel was then assembled with another cold rolled steel panel and pressed for 5 minutes at 320° C. under pressure of 20 kg/cm$^2$. The coated adhesive film had a thickness of 35 μm.

The lap shear strength of the specimen was 370 kg/cm$^2$ at the room temperature and 230 kg/cm$^2$ at high-temperature of 240° C. in accordance with JIS-K6848 and 6850.

A part of the polyamic acid solution was casted on a glass plate and heated for an hour each at 100° C., 200° C. and 300° C. to give a light yellow transparent polyimide film having thickness of 35 μm. The polyimide film obtained had tensile strength of 13.5 kg/mm$^2$ and elongation of 42% in accordance with ASTM D-882, glass transition temperature of 225° C. in accordance with TMA penetration method, and the 5% decrease by weight temperature in air of 542° C. in accordance with DTA-TG. Besides the polyimide film was inserted between the cold rolled steel panels which were preheated at 130° C., and pressed for 5 minutes at 320° C. under pressure of 20 kg/cm$^2$. The lap shear strength of the specimen was 350 kg/cm$^2$ at the room temperature and 212 kg/cm$^2$ at 240° C.

The polyamic acid solution was casted on an electrolytic copper foil and heated for an hour each at 100° C., 200° C. and 300° C. to give a flexible copper-clad circuit substrate. Thickness of the coated layer was about 35 μm. The peel strength of copper foil was 2.6 kg/cm by 90° peel test. Blister was not found at all after immersing in a solder bath at 300° C. for 180 seconds.

COMPARATIVE EXAMPLE 1

The polymerization of Example 1 was repeated except bis[4-(4-aminophenoxy)phenyl] sulfide was used in place of bis[4-(3-aminophenoxy)phenyl] sulfide. The inherent viscosity of polyamic acid obtained was 1.6 dl/g.

The polyamic acid solution was applied as Example 1 on a cold rolled steel panel and heated for an hour each at 100° C. and 220° C. The treated panel was assembled with another cold rolled steel panel and pressed for 5 minutes at 320° C. under pressure of 20 kg/cm$^2$. The coated adhesive film had thickness of 35 μm and gave a very inferior lap shear strength of 20 kg/cm² at the room temperature and 15 kg/cm² at 240° C.

Besides a part of the polyamic acid solution was casted on a glass plate and heated for an hour each at 100° C., 200° C. and 300° C. to give polyimide film. The polyimide film had tensile strength of 10.2 kg/mm² and elongation of 10%, and indicated no distinct glass transition temperature in accordance with TMA penetration method. The film had the 5% decrease by weight temperature in air of 521° C. The cold rolled steel panels were pressed as Example 1 by use of the polyimide film. The specimen had a very inferior lap shear strength of 20 kg/cm² at the room temperature.

EXAMPLE 2

A reaction vessel with a stirrer, reflux condenser and nitrogen inlet tube was charged with 150 grams of polyamic acid solution obtained in Example 1 and 225 grams of N,N-dimethylacetamide. Under nitrogen atmosphere and at the room temperature, 24.8 grams (0.24 mol) of acetic anhydride and 9.05 grams (0.09 mol) of triethylamine were dropped with stirring and stirred for 3 hours at the room temperature. The resultant solution was poured into 400 grams of water. The separated matter was filtered, washed with methanol and dried in vacuum at 150° C. for 8 hours to give 34 grams (96.3% yield) of light yellow polyimide powder. The powder had inherent viscosity of 0.72 dl/g, glass transition temperature of 215° C. in accordance with DSC method and the 5% decrease by weight temperature of 540° C.

The IR absorption spectrum atlas of polyimide powder obtained was illustrated in FIG. 1.

Remarkable absorption was found on this spectrum atlas at around 1780 cm$^{-1}$ and 1720 cm$^{-1}$ of characteristic absorption bands for imide and around 1240 cm$^{-1}$ of characteristic absorption band for ether linkage.

Melt viscosity of the powder obtained in this Example was measured with a flow tester (Shimadzu Seisakusho, CFT-500). The nozzle was diameter of 0.1 cm in diameter and 1 cm in length. Effect of temperature variation on shear rate vs. melt viscosity relationships is shown in FIG. 2. The strand obtained was light yellow, transparent, tough and very flexible.

Besides the polyimide powder was inserted between cold rolled steel panels which were preheated at 130° C. and pressed for 5 minutes at 320° C. under pressure of 20 kg/cm². The specimen had tensile strength of 360 kg/cm² at the room temperature and 210 kg/cm² at 240° C.

EXAMPLE 3

The same reaction vessel as Example 1 was charged with 40 grams (0.1 mol) of bis[4-(3-aminophenoxy)phenyl] sulfide and 214.8 grams of N,N-dimethylacetamide. Under nitrogen atmosphere and at the room temperature, 31.6 grams (0.098 mol) of 3,3',4,4'-benzophenone tetracarboxylic dianhydride were added as dry solid by portions with care to avoid temperature rise of the solution and stirred for 23 hours at the room temperature. The inherent viscosity of polyamic acid thus obtained was 1.2 dl/g.

The polyamic acid solution was applied on a cold rolled steel panel as Example 1 and dried.

The treated panel was then assembled with another cold rolled steel panel and pressed for 5 minutes at 320° C. under pressure of 20 kg/cm². The coated adhesive film had thickness of 35 μm.

The lap shear strength of the specimen was 340 kg/cm² at the room temperature and 210 kg/cm² at 240° C.

A part of the polyamic acid solution was casted on a glass plate and heated for an hour each at 100° C., 200° C. and 300° C. to give a light yellow transparent polyimide film having thickness of 35 μm. The polyimide film obtained had tensile strength of 14.0 kg/mm², elongation of 10%, glass transition temperature of 210° C., and the 5% decrease by weight temperature in air of 530° C. Besides the polyimide film was inserted between the cold rolled steel panels which were preheated at 130° C., and pressed for 5 minutes at 320° C. under pressure of 20 kg/cm². The lap shear strength of the specimen was 340 kg/cm² at the room temperature and 205 kg/cm² at 240° C.

COMPARATIVE EXAMPLE 2

The polymerization of Example 3 was repeated except bis[4-(4-aminophenoxy)phenyl] sulfide was used in place of bis[4-(3-aminophenoxy)phenyl] sulfide. The inherent viscosity of polyamic acid obtained was 0.84 dl/g.

The polyamic acid solution was applied as Example 1 on a cold rolled steel panel and dried. The treated panel was assembled with another cold rolled steel panel and pressed for 5 minutes at 320° C. under pressure of 20 kg/cm². The specimen gave lap shear strength of 160 kg/cm² at the room temperature and 100 kg/cm² at 240° C.

Besides a part of the polyamic acid solution was casted on a glass plate and heated for an hour each at 100° C., 200° C. and 300° C. to give light yellow transparent polyimide film having thickness of 35 μm.

The polyimide film had tensile strength of 13.0 kg/mm² and elongation of 10%, and indicated no distinct glass transition temperature. The film had the 5% decrease by weight temperature of 530° C. The cold rolled steel panels were pressed as Example 1 by use of the polyimide film. The specimen had an inferior lap shear strength of 150 kg/cm² at the room temperature and 100 kg/cm² at 240° C.

EXAMPLE 4

The same reaction vessel as Example 1 was charged with 40 grams (0.1 mol) of bis[4-(3-aminophenoxy)phenyl] sulfide and 184.5 grams of N,N-dimethylacetamide. Under nitrogen atmosphere and at the room temperature, 36.3 grams (0.0986 mol) of bis(3,4,-dicarboxyphenyl) ether dianhydride were added by portions with care to avoid temperature rise of the solution and stirred for 22 hours at room temperature. The inherent viscosity of polyamic acid thus obtained was 1.1 dl/g.

A part of the polyamic acid solution was casted on a glass plate and heated for an hour each at 100° C., 200° C. and 300° C. to give a colorless transparent polyimide film having thickness of 50 μm. The polyimide film obtained had light transmittance of 88% and haze of 0.69% in accordance with ASTM D-1003. The film also had glass transition temperature of 174° C. and the 5% by weight decrease temperature in air of 521° C.

Besides the polyimide film was inserted between cold rolled steel panels which were preheated at 130° C. and pressed for 5 minutes at 250° C. under pressure of 20 kg/cm². The specimen had lap shear strength of 320 kg/cm².

EXAMPLE 5

A reaction vessel with a stirrer, reflux condenser and nitrogen inlet tube was charged with 36.8 grams (0.1 mol) of 4,4'-bis-(3-aminophenoxy)biphenyl and 175.8 grams of N,N-dimethylacetamide. Under nitrogen atmosphere and at the room temperature, 21.8 grams (0.1 mol) of pyromellitic dianhydride were added by portions with care to avoid temperature rise of the solution and stirred for 20 hours at the room temperature. The inherent viscosity of polyamic acid thus obtained was 2.47 dl/g.

A part of the polyamic acid solution was casted on a glass plate and heated for an hour each at 100° C., 200° C. and 300° C. to give a light yellow and transparent polyimide film having thickness of 35 m. The polyimide film obtained had tensile strength of 14.8 kg/mm$^2$ and elongation of 70% in accordance with ASTM D-882, glass transition temperature of 271° C. in accordance with TMA penetration method and the 5% by weight decrease temperature in air of 545° C. Besides the polyimide film was inserted between the cold rolled steel panels which were preheated at 130° C., and pressed for 5 minutes at 340° C. under pressure of 20 kg/cm$^2$. The lap shear strength of the specimen was 310 kg/cm$^2$ at the room temperature and 205 kg/cm$^2$ at 240° C. Besides water absorption of the film was 0.52% after immersing for 24 hours at 23.5° C. in accordance with ASTM D-570-63. Change in appearance was also not found at all on the film after immersing the film in 30% by weight aqueous sodium hydroxide solution at 70° C.

The polyamic acid solution was casted on an electrolytic copper foil and heated for an hour each at 100° C., 200° C. and 350° C. to give a flexible copper-clad circuit substrate. Thickness of the coated film was about 35 m. The peel strength of copper foil was 2.8 kg/cm by 90° peel test. Blister was not found at all after immersing in a solder bath at 300° C. for 180 seconds.

Besides 150 grams of the polyamic acid solution was added with 337.5 grams of N,N-dimethylacetamide and heated to 70° C. under nitrogen atmosphere before dropping 26.1 grams (0.26 mol) of acetic anhydride and 9.05 grams (0.09 mol) of triethylamine. After the end of dropping, yellow powder of polyimide started to precipitate about 10 minutes. After stirring under heating for 2 hours, polyimide powder was hot-filtered, washed with methanol and dried in vacuum for 5 hours at 150° C. to give 34.5 grams (98% yield) of product. X-ray analysis of this powder results in 21% crystallinity.

Besides the IR spectrum atlas of the powder is illustrated in FIG. 3. Remarkable absorption was found on this spectrum atlas at around 1780 cm$^{-1}$ and 1720 cm$^{-1}$ of characteristic absorption bands for imide and around 1240 cm$^{-1}$ of characteristic absorption band for ether linkage.

The polyimide powder was quite insoluble in halogenated hydrocarbon solvents such as methylene chloride and chloroform. The polyimide powder had glass transition temperature of 260° C. and melting point of 367° C. in accordance with DSC method. The specimen which was compression molded at 400° C. for 30 minutes under pressure of 300 kg/cm$^2$ had notched Izod impact strength of 18 kg.cm/cm in accordance with ASTM D-256.

COMPARATIVE EXAMPLE 3

The polymerization of Example 1 was repeated except 4,4'-bis-(4-aminophenoxy)biphenyl was used in place of 4,4'-bis(3-aminophenoxy)biphenyl.

The inherent viscosity of polyamic acid obtained was 1.50 dl/g.

A part of the polyamic acid solution was casted on a glass plate and heated for an hour each at 100° C., 200° C. and 300° C. to give a light yellow transparent polyimide film. The film had tensile strength of 9.0 kg/mm$^2$, elongation of 20%, no distinct glass transition temperature in accordance with TMA penetration method, and the 5% by weight decrease temperature in air of 533° C.

The cold rolled steel panels were pressed with the polyimide film by the same method as Example 1.

The lap shear strength of the specimen at the room temperature had an inferior value of 50 kg/cm$^2$.

EXAMPLE 6

A reaction vessel with a stirrer, reflux condenser and nitrogen inlet tube was charged with 368 grams (1.0 mol) of 4,4'-bis-(3-aminophenoxy)biphenyl and 5,215 grams of N,N-dimethylacetamide. Under nitrogen atmosphere and at the room temperature, 211.46 grams (0.97 mol) of pyromellitic dianhydride was added by portions with care to avoid temperature rise of the solution and stirred for 20 hours at the room temperature. Polyamic acid thus obtained had inherent viscosity of 0.52 dl/g. The polyamic acid solution was dropped with 404 grams (4 mols) of triethylamine and 612 grams (6 mols) of acetic anhydride at the room temperature and under nitrogen atmosphere. Yellow polyimide powder started to precipitate at an hour after the end of dropping. The powder was filtered after stirring for further 20 hours at the room temperature, sludged with methanol, filtered and dried at 180° C. for 24 hours to give 529 grams (97.3% yield) of resultant polyimide powder.

The resultant polyimide powder had the same IR absorption spectrum atlas as FIG. 3 and crystallinity of 9.3% according to X-ray analysis. Melt viscosity of polyimide powder thus obtained was measured with the flow tester of The Society of Polymer Science Japan model (Shimadzu Seisakusho CFT-500) by use of the nozzle having 0.1 cm in diameter and 1 cm in length. Effect of temperature variation on shear rate vs. melt viscosity relationships is shown in FIG. 4. The strand obtained was light brown, transparent, tough and very flexible.

Brown, transparent and tough strands were extruded from the polyimide powder at 390° C. and pelletized. The pellets were molded by injection at 390° C. with pressure of 500 kg/cm$^2$ to give a brown and transparent molded product. In accordance with ASTM D-638, the molded product had tensile yield strength of 1,240 kg/cm$^2$, tensile strength of 1,110 kg/cm$^2$ and elongation of 40%. In accordance with ASTM D-648, the molded product had notched Izod impact strength of 18.2 kg.cm/cm and heat distortion temperature of 250° C.

EXAMPLE 7

A vessel with a stirrer, reflux condenser and nitrogen inlet tube was charged with 3.68 grams (0.01 mol) of 4,4'-bis(3-aminophenoxy)biphenyl, 2.11 grams (0.0097 mol) of pyromellitic dianhydride and 52.1 grams of m-cresol, and heated with stirring under nitrogen atmosphere. The mixture gave a brown, transparent and uniform solution at around 135° C. The temperature was raised to 150° C. and the stirring was continued.

Yellow polyimide powder was started to precipitate in 10 minutes, stirred for further 2 hours with heating and filtered. The polyimide powder was washed with methanol and acetone, and dried in vacuum at 180° C. for 24 hours to give 4.62 grams (85.1% yield) of the product. The polyimide powder thus obtained had the same IR absorption spectrum atlas as FIG. 3.

EXAMPLE 8

A reaction vessel with a stirrer, reflux condenser and nitrogen inlet tube was charged with 36.8 grams (0.1 mol) of 4,4'-bis-(3-aminophenoxy)biphenyl and 175.8 grams of N,N -dimethylacetamide. Under nitrogen atmosphere and at the room temperature, 20.71 grams (0.095 mol) of pyromellitic dianhydride was added by portions with care to avoid temperature rise of the solution and stirred for 20 hours at the room temperature. Polyamic acid thus obtained had inherent viscosity of 0.60 dl/g.

The polyamic acid solution was added with 160 grams of N,N-dimethylacetamide, warmed to 70° C., and dropped with 20.4 grams (0.2 mol) of acetic anhydride and 7.1 grams (0.07 mol) of triethylamine.

Yellow polyimide powder started to precipitate in 10 minutes after the end of dropping. The powder was hot-filtered after stirring for further 2 hours with heating, sludged with methanol, filtered and dried at 150° C. for 5 hours to give 53.8 grams (97% yield) of resultant polyimide powder.

FIG. 2 shows IR absorption spectrum atlas of the resultant polyimide powder.

On this spectrum atlas, remarkable absorption was found at characteristic bands for imide of around 1780 $cm^{-1}$ and 1720 $cm^{-1}$ as well as for ether linkage of around 1240 $cm^{-1}$.

Polyimide thus obtained had melt viscosity of $5 \times 10^3$ poise at 400° C. by use of 100 kg load an nozzle having 0.1 cm in diameter. The strand obtained was brown, transparent, tough and very flexible.

The polyimide film was inserted between cold rolled steel panels which were preheated at 130° C. and pressed for 5 minutes at 340° C. under pressure of 20 $kg/cm^2$. The specimen had lap shear strength of 305 $kg/cm^2$ at the room temperature and 210 $kg/cm^2$ at 240° C.

EXAMPLE 9

The same reaction vessel as Example 5 was charged with 18.4 grams (0.05 mol) of 4,4'-bis(3-aminophenoxy)-biphenyl and 103.5 grams of N,N-dimethylacetamide. Under nitrogen atmosphere and at the room temperature, 16.1 grams (0.05 mol) of 3,3',4,4'-benzophenone tetracarboxylic dianhydride were added by portions with care to avoid temperature rise of the solution and stirred for about 20 hours. Polyamic acid thus obtained had inherent viscosity of 1.62 dl/g.

A part of the polyamic acid solution was casted on a glass plate and heated for an hour each at 100° C., 200° C. and 300° C. to give a light yellow, transparent polyimide film. The polyimide film had tensile strength of 13.5 $kg/mm^2$, elongation of 11%, glass transition temperature of 230° C. and the 5% by weight decrease temperature in air of 538° C.

Besides the polyimide film was inserted between the cold rolled steel panels which were preheated at 130° C. and pressed for 5 minutes at 340° C. under pressure of 20 $kg/cm^2$. The specimen had lap shear strength of 280 $kg/cm^2$ at the room temperature.

In addition, the polyamic acid solution was applied on a cold rolled steel panel and dried by heating for an hour each at 100° C. and 220° C. The coated panel was assembled with another steel panel and pressed for 5 minutes at 300° C. under pressure of 20 $kg/cm^2$. The specimen obtained had lap shear strength of 260 $kg/cm^2$ at the room temperature.

COMPARATIVE EXAMPLE 4

The polymerization of Example 3 was repeated except 4,4'-bis-(4-aminophenoxy)biphenyl was used in place of 4,4'-bis(3-aminophenoxy)biphenyl. The polyamic acid obtained had inherent viscosity of 1.28 dl/g. A part of the polyamic acid solution was casted on a glass plate and heated for an hour each at 100° C., 200° C. and 300° C. to give a light yellow and transparent polyimide film. The polyimide film obtained had no distinct glass transition temperature, the 5% by weight decrease temperature in air of 505° C., tensile strength of 13.3 $kg/mm^2$ and elongation of 8%. Besides cold rolled steel panels were pressed with the polyimide film by the same procedure as Example 5. The specimen had an inferior lap shear strength of 40 $kg/cm^2$.

EXAMPLE 10

The same reaction vessel as Example 5 was charged with 9.2 grams (0.025 mol) of 4,4'-bis(3-aminophenoxy)-biphenyl and 50.85 grams of N,N-dimethylacetamide. Under nitrogen atmosphere and at the room temperature, 7.75 grams (0.025 mol) of bis(3,4-dicarboxyphenyl) ether dianhydride were added by portions with care to avoid temperature rise of the solution and stirred for further 20 hours at the room temperature. The polyamic acid thus obtained had inherent viscosity of 1.70 dl/g.

A part of the polyamic acid solution was casted on the glass plate and heated for an hour each at 100° C., 200° C. and 300° C. to give a colorless and transparent polyimide film having thickness of about 50 μm. The film had tensile strength of 15.2 $kg/mm^2$, elongation of 10%, glass transition temperature of 208° C. and the 5% by weight decrease temperature in air of 503° C.

Besides the polyimide film was inserted between cold rolled steel panels which were preheated at 130° C. and pressed for 5 minutes at 340° C. under pressure of 20 $kg/cm^2$. The specimen had lap shear strength of 307 $kg/cm^2$ at the room temperature. The polyimide film had light transmittance of 86% and haze of 0.69% in accordance with ASTM D-1003.

EXAMPLE 11

The same reaction vessel as Example 5 was charged with 9.2 grams (0.025 mol) of 4,4'-bis(3-aminophenoxy)-biphenyl and 42.45 grams of N,N-dimethylacetamide. Under nitrogen atmosphere and at the room temperature, 4.95 grams (0.025 mol) of 1,2,3,4-butane tetracarboxylic dianhydride were added by portions with care to avoid temperature rise of the solution and stirred for further 20 hours at the room temperature. The polyamic acid thus obtained had inherent viscosity of 0.35 dl/g.

A part of the polyamic acid solution was casted on the glass plate and heated for an hour each at 100° C., 200° C. and 300° C. to give a yellow-orange and transparent polyimide film. The film had tensile strength of 11.0 $kg/mm^2$, elongation of 8%, glass transition temperature of 207° C. and the 5% by weight decrease temperature in air of 400° C.

EXAMPLE 12

The same reaction vessel as Example 5 was charged with 9.2 grams (0.025 mol) of 4,4'-bis(3-aminophenoxy)biphenyl and 42.45 grams of bis(2-methoxyethyl) ether. Under nitrogen atmosphere and at the room temperature, 5.45 grams (0.025 mol) of pyromellitic dianhydride were added by portions with care to avoid temperature rise of the solution and stirred for further 20 hours at the room temperature. The polyamic acid thus obtained had inherent viscosity of 1.55 dl/g.

The polyamic acid solution was applied on the cold rolled steel panel which was previously washed with trichloroethylene and dried by heating for an hour each at 100° C. and 220° C. The coated panel was assembled with another cold rolled steel panel and pressed for 5 minutes at 300° C. under pressure of 20 kg/cm². The specimen had lap shear strength of 280 kg/cm² at the room temperature.

EXAMPLE 13

A vessel with a stirrer, reflux condenser and nitrogen inlet tube was charged with 41.0 grams (0.1 mol) of 2,2-bis[4-(3-aminophenoxy)phenyl]propane and 219.6 grams of N,N-dimethylacetamide. Under nitrogen atmosphere and at the room temperature, 31.6 grams (0.098 mol) of 3,3',4,4'-benzophenone tetracarboxylic dianhydride were added as dry solids by small portions with care to avoid temperature rise of the solution, and reacted for 23 hours at the room temperature. The polyamic acid obtained had inherent viscosity of 0.70 dl/g. A reaction vessel with a stirrer, reflux condenser and nitrogen inlet tube was charged with 87.8 grams of the polyamic acid solution, raised the temperature to 70° C., and dropped for 30 minutes with a mixture of 12.3 grams (0.12 mol) of acetic anhydride and 4.25 grams (0.04 mol) of triethylamine. After stirring for further 2 hours, the solution obtained was poured into 200 grams of water. The precipitate was filtered, washed with methanol and dried in vacuum at 150° C. for 8 hours to give 20.76 grams of light yellow powder. The powder had glass transition temperature of 210° C. in accordance with DSC method and the 5% by weight decrease temperature of 510° C.

IR absorption spectrum atlas is illustrated in FIG. 6. Remarkable absorption was found at characteristic bands of around 1780 cm$^{-1}$ and 1720 cm$^{-1}$ for imide on the spectrum atlas.

Besides the polyimide had inherent viscosity of 0.40 dl/g.

The polyimide powder was inserted between cold rolled steel panels which were previously washed with trichloroethylene and preheated at 130° C., and pressed for 5 minutes at 340° C. under pressure of 20 kg/cm². The specimen had lap shear strength of 290 kg/cm² at the room temperature and 176 kg/cm² at 240° C.

The polyimide powder thus obtained was soluble at the room temperature more than 20% by weight in halogenated aliphatic hydrocarbon such as dichloromethane, chloroform, 1,2-dichloroethane, 1,1,2-trichloroethane, 1,1,2,2-tetrachloroethane, ethylbromide and tetrabromoethane.

In addition, 5 grams of the polyimide powder obtained were dissolved into 20 grams of 1,2-dichloroethane, casted on the glass plate and allowed to dry. The self-supported polyimide film thus obtained was inserted between cold rolled steel panels which were preheated at 130° C. and pressed for 5 minutes at 200° C. under pressure of 20 kg/cm². The specimen had lap shear strength of 315 kg/cm² at the room temperature.

Each 5 grams of the polyimide powder obtained were dissolved into 20 grams of 1,2-dichloroethane, 1,1,2-trichloroethane, 1,1,2,2-tetrachloroethane respectively and the resultant solution was heated at 200° C., 250° C. respectively.

Solubility of films thus obtained is illustrated in Table 1.

TABLE 1

| Solubility test of films (1% by weight of film in solvent) | | | | | |
|---|---|---|---|---|---|
| Solvent for casting film | Curing temperature | Solvent for film solubility test | | | |
| | | DIM | DIE | TRE | TEE |
| DIE | 200° C. | ○ | ○ | ○ | ○ |
| TRE | | ○ | ○ | ○ | ○ |
| TEE | | ○ | ○ | ◐ | ○ |
| DIE | 250° C. | X | X | X | X |
| TRE | | X | X | X | X |
| TEE | | X | X | X | X |
| DIE | 300° C. | X | X | X | X |
| TRE | | X | X | X | X |
| TEE | | X | X | X | X |

Solvents
DIM: dichloromethane
DIE: 1,2-dichloroethane
TRE: 1,1,2-trichloroethane
TEE: 1,1,2,2-tetrachloroethane
Solubility
○: soluble
◐: swell
X: insoluble

COMPARATIVE EXAMPLE 5

Polyamic acid having inherent viscosity of 1.16 dl/g was obtained by repeating the procedure of Example 13, except 2,2-bis[4-(4-aminophenoxy)phenyl]propane in place of 2,2-bis-[4-(3-aminophenoxy)phenyl]propane.

A reaction vessel with a stirrer, reflux condenser and nitrogen inlet tube was charged with 87.8 grams of the solution above obtained, raised the temperature to 70° C. and dropped for 30 minutes with the mixture of 12.3 grams (0.12 mol) of acetic anhydride and 4.25 grams (0.04 mol) of triethylamine. The solution became turbid during dropping and completely gelled at the end of dropping. The gel obtained was poured into 200 grams of water, washed with methanol and dried in vacuum for 8 hours at 150° C. to give 20.65 grams of yellow powder.

IR absorption spectrum of the powder obtained indicated remarkable absorption at characteristic bands for imide of around 1780 cm$^{-1}$ and 1720 cm$^{-1}$.

By the same procedure as Example 13, the polyimide powder was inserted between cold rolled steel panels which were previously washed with trichloroethylene and preheated at 130° C., and pressed for 5 minutes at 340° C. under pressure of 20 kg/cm². The specimen had lap shear strength of 160 kg/cm² at the room temperature and 112 kg/cm² at 240° C.

The polyimide powder was insoluble in halogenated aliphatic hydrocarbon such as dichloromethane, chloroform, 1,2-dichloroethane, 1,1,2-trichloroethane, 1,1,2,2-tetrachloroethane, ethylbromide and tetrabromoethane. The polyimide powder had glass transition temperature of 246° C. in accordance with DSC method and the 5% by weight decrease temperature was 502° C.

EXAMPLE 14

A reaction vessel with a stirrer, reflux condenser and nitrogen inlet tube was charged with 87.8 grams of polyamic acid solution in N,N-dimethylacetamide obtained in Example 13 and stirred under reflux for 2 hours at 150°-160° C. A half of the solution was poured into 100 grams of water. The precipitate was filtered, washed with methanol and dried in vacuum for 5 hours at 150° C. to give 10.3 grams of light yellow powder. The powder had inherent viscosity of 0.38 dl/g, glass transition temperature of 208° C. in accordance with DSC method, and the 5% by weight decrease temperature of 510° C. Besides IR absorption spectrum of the powder was the same as Example 13 and had characteristic band for polyimide at around 1780 cm$^{-1}$ and 1720 cm$^{-1}$.

The polyimide solution in N,N-dimethylacetamide was applied on the cold rolled steel panel which was previously washed with trichloroethylene, dried, assembled with another cold rolled steel panels and pressed for 5 minutes at 340° C. under pressure of 20 kg/cm$^2$. The specimen had lap shear strength of 295 kg/cm$^2$ at the room temperature and 178 kg/cm$^2$ at 240° C.

The polyimide powder obtained was soluble 20% by weight and more in solvents which dissolved the powder obtained in Example 13.

EXAMPLE 15

A reaction vessel with a stirrer, reflux condenser and nitrogen inlet tube was charged with 41.0 grams (0.1 mol) of 2,2-bis[4-(3-aminophenoxy)phenyl]propane and 188.4 grams of N,N-dimethylacetamide, and cooled to about 0° C. Under nitrogen atmosphere 17.44 grams (0.08 mol) of pyromellitic dianhydride were added by four portions with care to avoid temperature rise of the solution and stirred for about 2 hours at around 0° C. The temperature of reaction mixture was then raised to the room temperature and 4.36 grams (0.02 mol) of pyromellitic dianhydride were added under nitrogen atmosphere, followed by further stirring for 20 hours under nitrogen atmosphere.

The polyamic acid thus obtained had inherent viscosity of 1.5 dl/g at 35° C. in 0.5% N,N-dimethylacetamide solution.

The polyamic acid solution thus obtained was casted on the glass plate and heated for an hour each at 100° C., 200° C. and 300° C. to give polyimide film. The polyimide film thus obtained was inserted between cold rolled steel panels which were preheated at 130° C. and pressed for 5 minutes at 340° C. under pressure of 20 kg/cm$^2$. The specimen had lap shear strength of 300 kg/cm$^2$ at the room temperature and 180 kg/cm$^2$ at 240° C.

COMPARATIVE EXAMPLE 6

The procedure of Example 15 was repeated except 2,2-bis[4-(4-aminophenoxy)phenyl]propane was used in place of 2,2-bis[4-(3-aminophenoxy)phenyl]propane. Polyamic acid obtained had inherent viscosity of 1.70 dl/g at 35° C. in 0.5% N,N-dimethylacetamide solution. The polyamic acid solution was casted on the glass plate and heated for an hour each at 100° C., 200° C. and 300° C. to give polyimide film.

The film thus obtained was pressed between the cold rolled steel panels by the same conditions as Example 15. The specimen had lap shear strength of 84 kg/cm$^2$ at the room temperature and 67 kg/cm$^2$ at 240° C.

EXAMPLE 16

A reaction vessel with a stirrer, reflux condenser and nitrogen inlet tube was charged with 39.6 grams (0.1 mol) of bis-[4-(3-aminophenoxy)phenyl] ketone and 215.4 grams of N,N-dimethylacetamide. Under nitrogen atmosphere and at the room temperature, 32.2 grams (0.1 mol) of 3,3',4,4'-benzophenone tetracarboxylic dianhydride were added as dry solids by small portions with care to avoid temperature rise of the solution and stirred for 23 hours at the room temperature. The polyamic acid thus obtained had inherent viscosity of 0.87 dl/g at 35° C. in 0.5% N,N-dimethylacetamide solution.

The polyamic acid adhesive solution thus obtained was applied on the cold rolled steel panel which was previously washed with trichloroethylene and dried by heating for an hour each at 100° C. and 220° C. The coated panel was assembled with another cold rolled steel panel and pressed for 5 minutes at 340° C. for 20 kg/cm$^2$. The coated adhesive had thickness of 35 μm.

The specimen had lap shear strength of 270 kg/cm$^2$ at the room temperature and 167 kg/cm$^2$ at 240° C.

EXAMPLE 17

In a reaction vessel with a stirrer, reflux condenser and nitrogen inlet tube, 39.6 grams (0.1 mol) of bis[4-(3-aminophenoxy)phenyl] ketone were dissolved into 182.9 grams of N,N-dimethylacetamide under nitrogen atmosphere. The solution obtained was cooled to about 0° C. and 17.44 grams (0.08 mol) of pyromellitic dianhydride was added as dry solids with stirring under nitrogen atmosphere by five portions with care to avoid temperature rise of the solution. The mixture was stirred for an hour and its temperature was raised to the room temperature. Under nitrogen atmosphere, 3.92 grams (0.018 mol) of pyromellitic dianhydride were added and stirred for 20 hours under nitrogen atmosphere.

Polyamic acid thus obtained had inherent viscosity of 0.85 dl/g at 35° C. in 0.5% N,N-dimethylacetamide solution.

The polyamic acid solution was casted on the glass plate and heated for an hour each at 100° C., 200° C. and 300° C. to give polyimide film.

The resultant polyimide film was inserted between cold rolled steel panels which were preheated at 130° C. and pressed for 5 minutes at 340° C. under pressure of 20 kg/cm$^2$.

The specimen had lap shear strength of 240 kg/cm$^2$ at the room temperature and 163 kg/cm$^2$ at 240° C.

EXAMPLE 18

A reaction vessel with a stirrer, reflux condenser and nitrogen inlet tube was charged under nitrogen atmosphere with 39.6 grams (0.1 mol) of bis[4-(3-aminophenoxy)phenyl] ketone and 184.2 grams of N,N-dimethylacetamide, and cooled to about 0° C. With stirring under nitrogen atmosphere, 17.44 grams (0.08 mol) of pyromellitic dianhydride were added as dry solids by five portions with care to avoid temperature rise of the solution and stirred for an hour. The temperature of the solution was raised to the room temperature and 4.36 grams (0.02 mol) of pyromellitic dianhydride was added under nitrogen atmosphere and further stirred for about 20 hours under nitrogen atmosphere. Polyamic acid thus obtained had inherent viscosity of 2.8 dl/g at 35° C.

in 0.5% N,N-dimethylacetamide solution. The polyamic acid solution was casted on the glass plate and heated for an hour each at 100° C., 200° C. and 300° C. to give polyimide film. The polyimide film thus obtained was inserted between cold rolled steel panels which were preheated at 130° C. and pressed for 5 minutes at 340° C. under pressure of 20 kg/cm².

The specimen had lap shear strength of 280 kg/cm² at the room temperature and 192 kg/cm² at 240° C.

COMPARATIVE EXAMPLE 7

The procedure of Example 4 was repeated except bis[4-(4-aminophenoxy)phenyl] ketone was used in place of bis[4-(3-aminophenoxy)phenyl] ketone in Example 8. Polyamic acid obtained had inherent viscosity of 2.8 dl/g at 35° C. in 0.5% N,N-dimethylacetamide solution.

The polyimide film obtained by the same procedure as Example 18 was pressed between the cold rolled steel panels with the conditions of Example 18. The specimen had lap shear strength of 60 kg/cm² at the room temperature and 48 kg/cm² at 240° C.

EXAMPLE 19

The procedure of Example 15 was repeated except 43.2 grams (0.1 mol) of bis[4-(3-aminophenoxy)phenyl] sulfone were used in place of 2,2-bis[4-(3-aminophenoxy)phenyl]propane and the quantity of N,N-dimethylacetamide was altered to 195 grams. Polyamic acid obtained had inherent viscosity of 1.6 dl/g. The same adhesion test as Example 15 by use of the polyamic acid of this Example gave lap shear strength of 190 kg/cm² at the room temperature and 150 kg/cm² at 240° C.

COMPARATIVE EXAMPLE 7

The procedure of Example 19 was repeated except bis[4-(4-aminophenoxy)phenyl] sulfone was used in place of bis[4-(3-aminophenoxy)phenyl] sulfone. Polyamic acid obtained had inherent viscosity of 1.4 dl/g. The same adhesion test by use of the polyamic acid of this Example gave inferior lap shear strength of 80 kg/cm² at the room temperature and 66 kg/cm² at 240° C.

FEASIBILITY FOR INDUSTRIAL UTILIZATION

The present invention provides a novel polyimide which has excellent processability and high-temperature adhesion in addition to its essentially outstanding high-temperature stability and can be used for multiple purposes.

The invention further provides a new high-temperature adhesive consisting of said polyimide.

BRIEF EXPLANATION OF DRAWINGS

FIGS. 1, 3, 5 and 6 are Examples on the IR absorption spectrum atlas of the polyimide powder.

Figure 1:
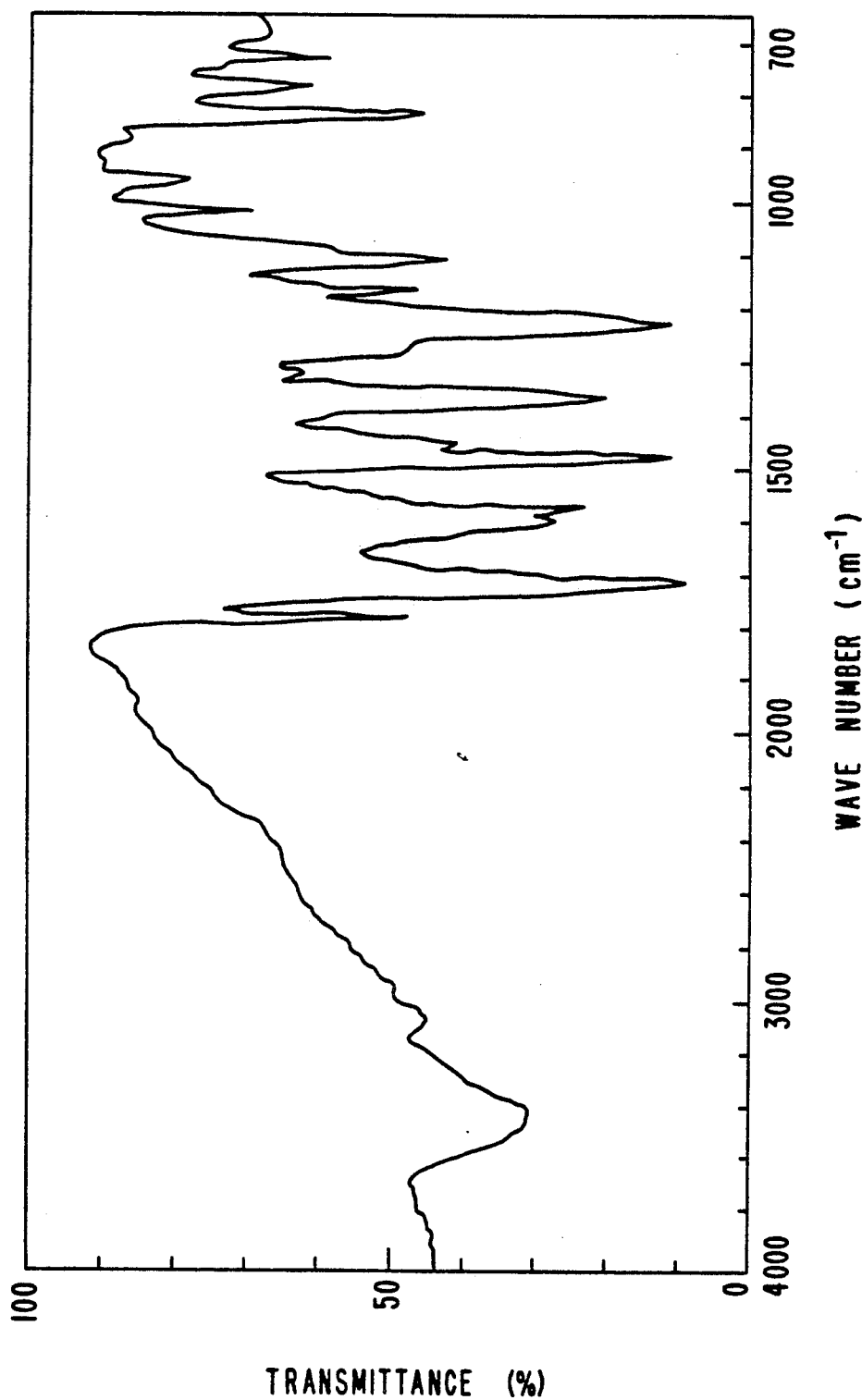
Figure 2:
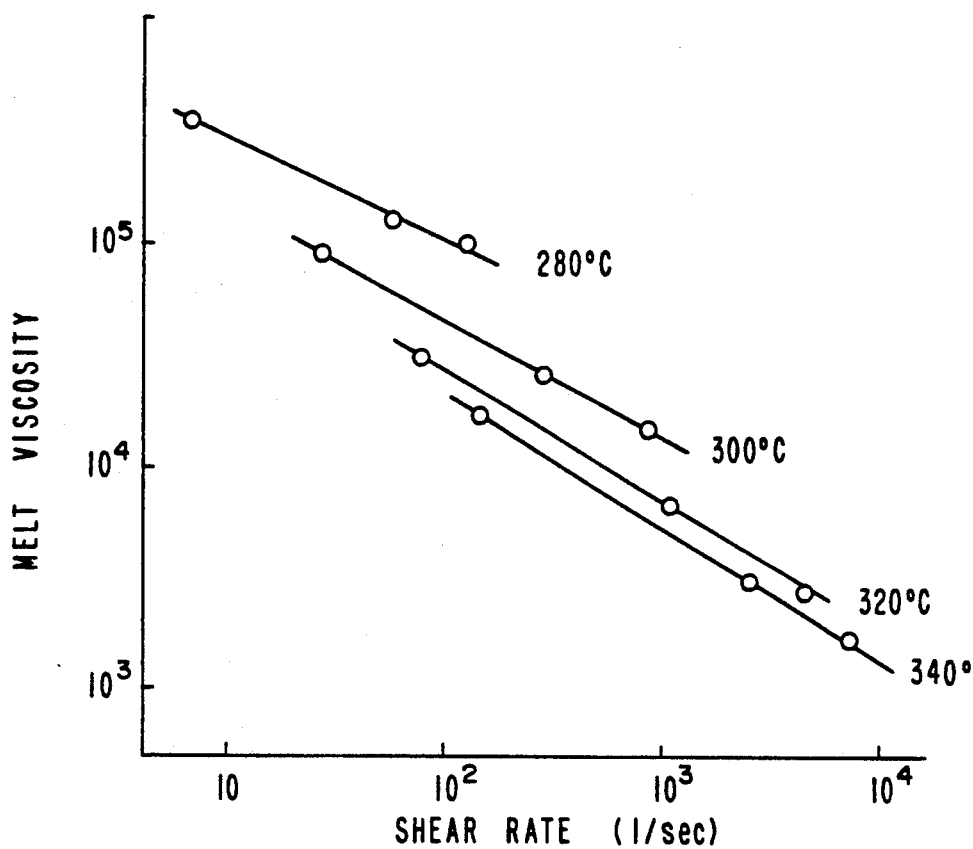
FIGS. 2 and 4 illustrate the relation between shear rate and melt viscosity of polyimide of this invention.
Figure 4:
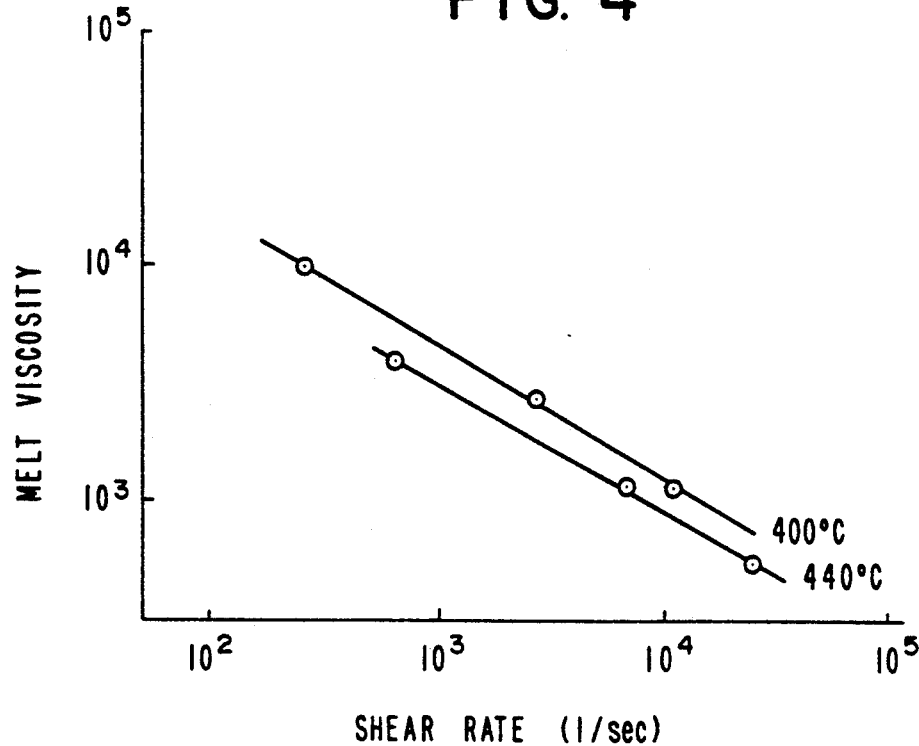
Figure 5:
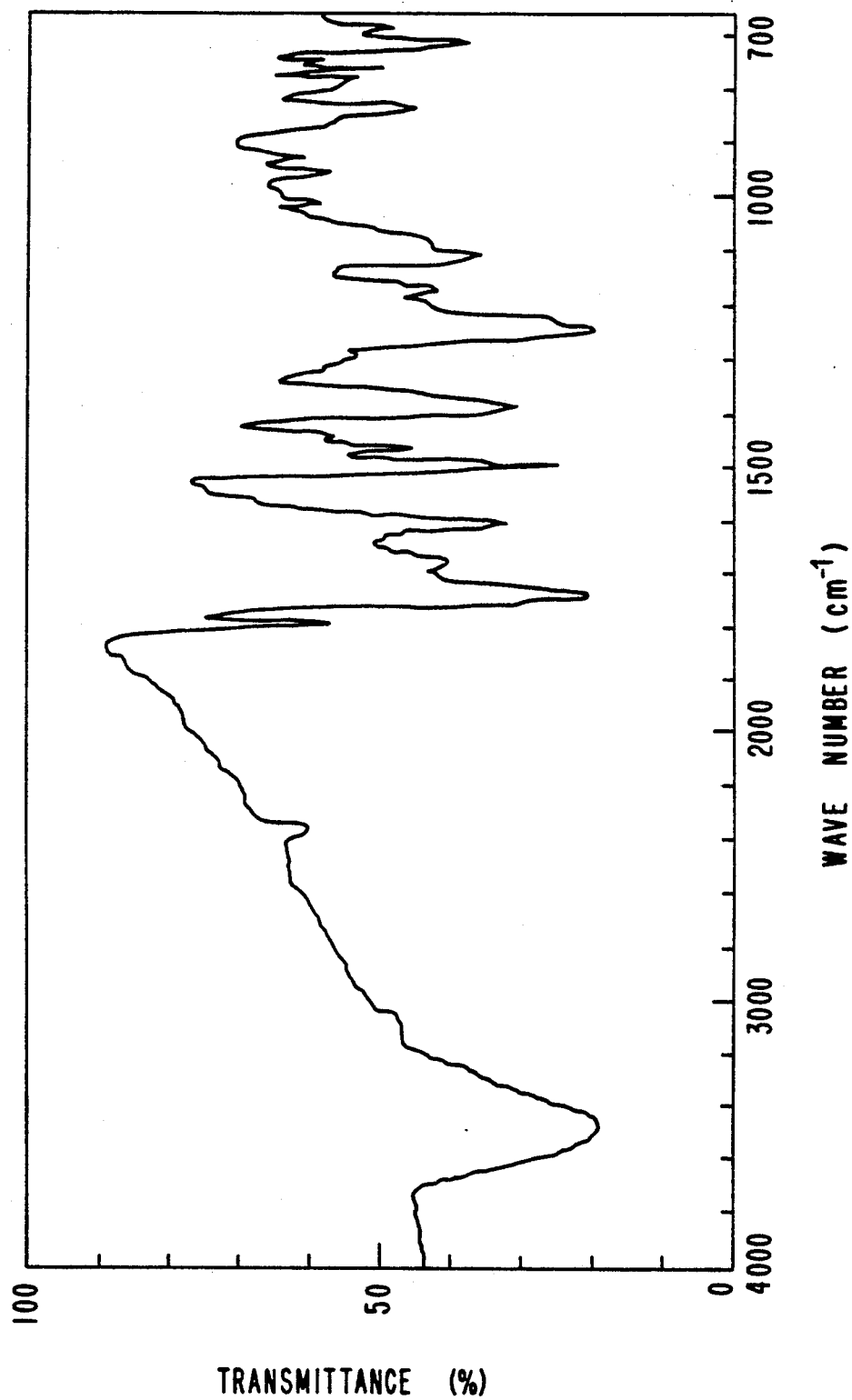
Figure 6:
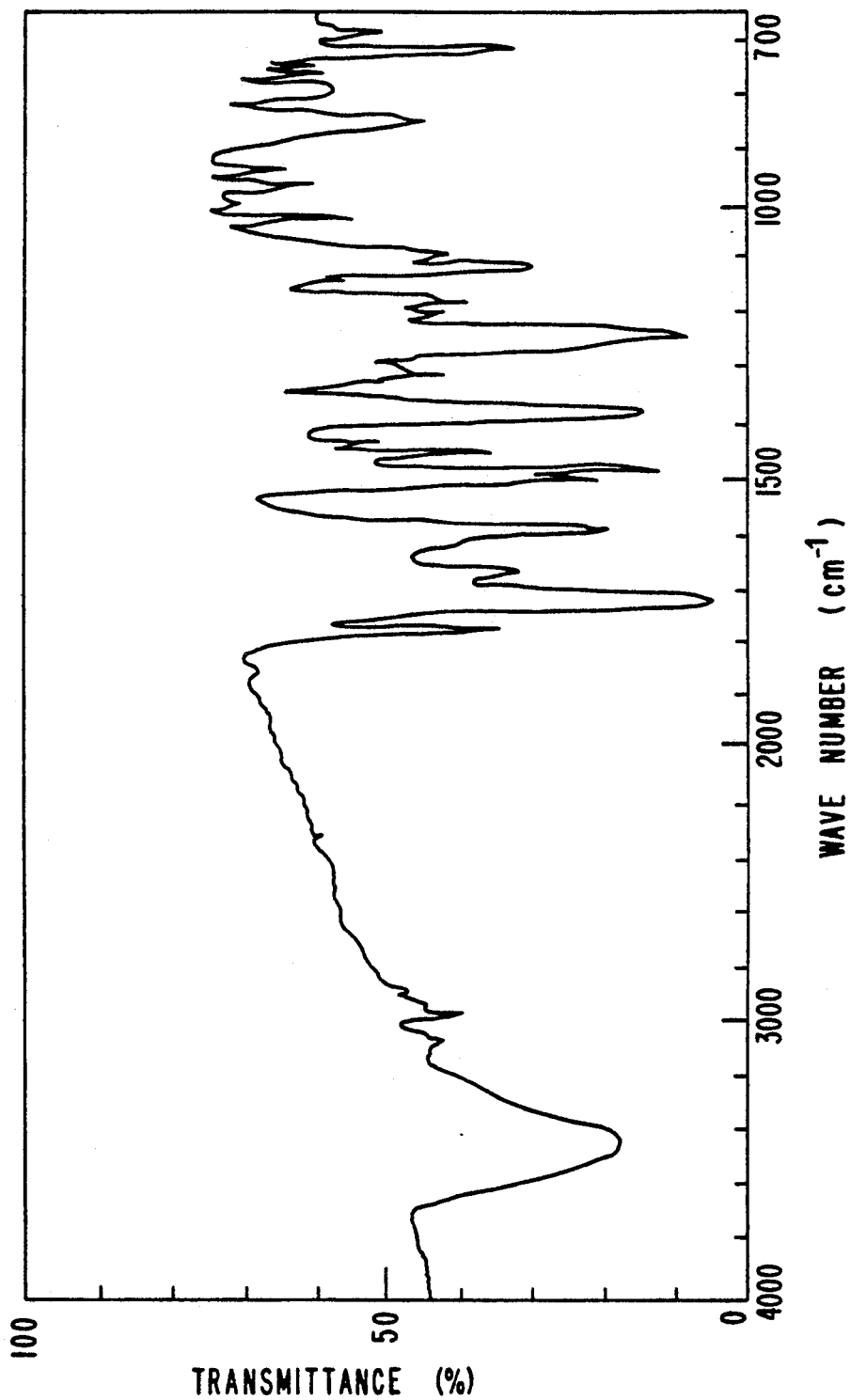

We claim:

1. A polymer consisting essentially of a recurring unit represented by formula:

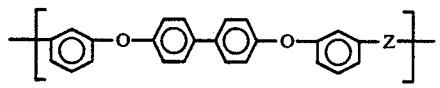

wherein Z is selected from the group consisting of:

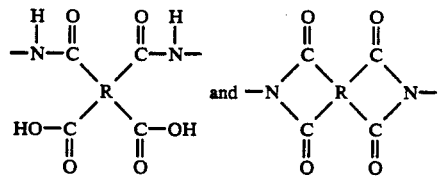

and R is a tetra-valent radical selected from the group consisting of an aliphatic radical having two or more carbon atoms, a cycloaliphatic radical, a monoaromatic radical and a condensed polyaromatic radical wherein the aromatic radicals are mutually connected with a bond or a crosslinking function, and at least one recurring unit is represented by formula:

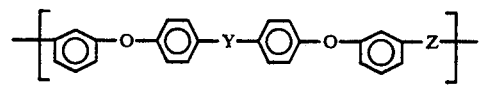

wherein Y is a radical selected from the group consisting of a divalent hydrocarbon having 1 to 10 carbon atoms, hexafluorinated isopropylidene, carbonyl, thio, sulfinyl, sulfonyl and oxide, and Z has the above-stated meaning, which is obtained by reacting a mixture of a diamine represented by formula:

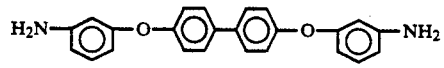

and at least one diamine represented by formula:

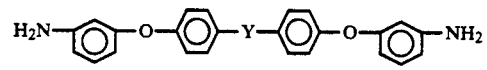

wherein Y has the above-stated meaning, with tetracarboxylic acid dianhydride represented by formula:

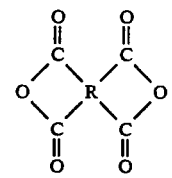

wherein R has the above-stated meaning.

2. The polymer of claim 1 wherein said diamine represented by formula:

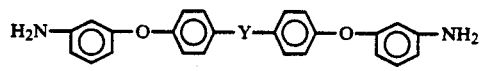

is selected from the group consisting of bis[4-(3-aminophenoxy)phenyl]methane, 1,1-bis[4-(3-aminophenoxy)phenyl]ethane, 1,2-bis[4-(3-aminophenoxy)phenyl]ethane, 2,2-bis[4-(3-aminophenoxy)phenyl]propane, 2,2-bis[4-(3-aminophenoxy)phenyl]butane, 2,2-bis[4-(3-aminophenoxy)phenyl]-1,1,1,3,3,3-hexafluoropropane, bis[4-(3-aminophenoxy)phenyl]ketone, bis[4-(3-aminophenoxy)phenyl]sulfide, bis[4-(3-aminophenoxy)- phenyl]sulfoxide, bis[4-(3-aminophenoxy)phenyl]sulfone and bis[4-(3-aminophenoxy)phenyl]ether.

3. The polymer of claim 1 wherein Z is:

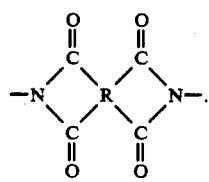

4. The polymer of claim 1 wherein Z is:

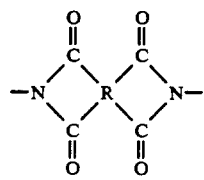

and R is a tetravalent radical of formula:

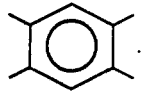

5. A polymer consisting essentially of two or more recurring units which is represented by formula:

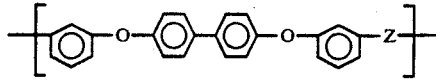

wherein Z is selected from the group consisting of

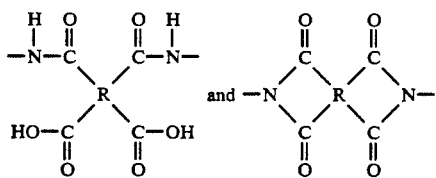

and R is a tetravalent radical selected from the group consisting of an aliphatic radical having 2 and more carbons, a cycloaliphatic radical, a monoaromatic radical, and a condensed polyaromatic radical wherein the aromatic radicals are mutually connected with a bond or a crosslinking function, and each Z in the units differ from one another.

6. A high-temperature stable adhesive of a polymer consisting essentially of a recurring unit of formula:

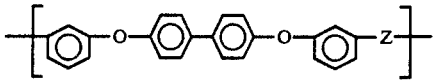

wherein Z is selected from the group consisting of:

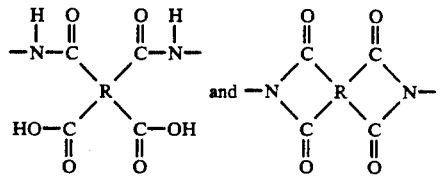

and R is a tetra-valent radical selected from the group consisting of an aliphatic radical having two or more carbons, a cycloaliphatic radical, a monoaromatic radical and a condensed polyaromatic radical wherein the aromatic radicals are mutually connected with a bond or a crosslinking function, and at least one recurring unit is represented by formula:

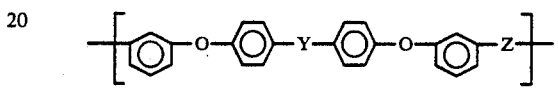

wherein Y is a radical selected from the group consisting of a divalent hydrocarbon having 1 to 10 carbon atoms, hexafluorinated isopropylidene, carbonyl, thio, sulfinyl, sulfonyl, and oxide, and Z has the above-stated meaning, which is obtained by reacting a mixture of a diamine represented by formula:

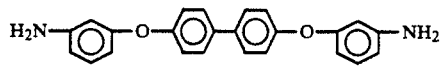

and at least one diamine represented by formula:

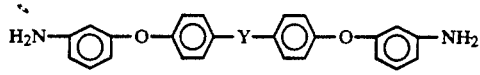

wherein Y has the above-stated meaning, with tetracarboxylic acid dianhydride represented by formula:

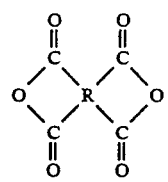

wherein R has the above-stated meaning.

7. The high-temperature adhesive of claim 6 wherein Z is:

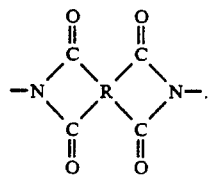

8. The high temperature adhesive of claim 6 wherein Z is:

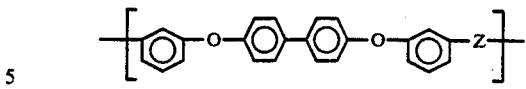

wherein Z is selected from the group consisting of:

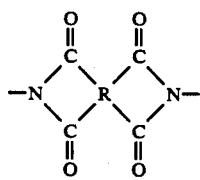

and R is a tetravalent radical of formula:

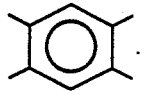

9. A high temperature adhesive of a polymer consisting essentially of two or more recurring units which is represented by formula:

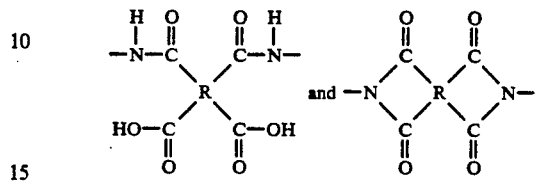

and R is a tetra-valent radical selected from the group consisting of an aliphatic radical having 2 and more carbons, a cycloaliphatic radical, a monoaromatic radical and a condensed polyaromatic radical wherein the aromatic radicals are mutually connected with a bond or a crosslinking function, and each Z in the units differ from one another.

* * * * *